(12) United States Patent
Nakao

(10) Patent No.: US 6,352,322 B1
(45) Date of Patent: Mar. 5, 2002

(54) PORTABLE LIQUID CRYSTAL DISPLAY DEVICE

(75) Inventor: Takuji Nakao, Tanashi (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/284,745
(22) PCT Filed: Aug. 21, 1998
(86) PCT No.: PCT/JP98/03717
  § 371 Date: Apr. 20, 1999
  § 102(e) Date: Apr. 20, 1999
(87) PCT Pub. No.: WO99/10860
  PCT Pub. Date: Mar. 4, 1999

(30) Foreign Application Priority Data

Aug. 21, 1997 (JP) .............................................. 9-224786
Aug. 21, 1997 (JP) .............................................. 9-224787
Sep. 19, 1997 (JP) .............................................. 9-254884
Sep. 19, 1997 (JP) .............................................. 9-254885
Sep. 19, 1997 (JP) .............................................. 9-254886

(51) Int. Cl.[7] .............................. A47B 97/00; H04N 5/64
(52) U.S. Cl. ....................... 312/223.1; 312/7.2; 348/794
(58) Field of Search ................................. 348/794, 836, 348/838, 840, 841; 312/223.1, 7.2, 223.2; 40/753, 448; 361/681; 349/58

(56) References Cited

U.S. PATENT DOCUMENTS

| | | | | |
|---|---|---|---|---|
| 959,922 A | * | 5/1910 | Cohn ........................ | 40/753 X |
| 2,523,136 A | * | 9/1950 | Miles ........................ | 40/753 X |
| 4,562,478 A | * | 12/1985 | Hirasawa et al. ............ | 348/794 |
| 4,587,567 A | * | 5/1986 | Yamamori et al. ........ | 312/7.2 X |
| 4,635,128 A | * | 1/1987 | Toyoda ........................ | 348/794 |
| 4,639,225 A | * | 1/1987 | Washizuka ............... | 348/838 X |
| 4,809,078 A | * | 2/1989 | Yabe et al. ................. | 348/794 |
| 5,119,204 A | * | 6/1992 | Hashimoto et al. ......... | 348/794 |
| 5,329,712 A | * | 7/1994 | Keller ........................ | 40/753 X |
| 5,419,626 A | * | 5/1995 | Crockett ..................... | 312/7.2 |
| 5,479,285 A | * | 12/1995 | Burke .......................... | 349/58 |
| 5,887,959 A | * | 3/1999 | Yuri ............................ | 312/7.2 |

FOREIGN PATENT DOCUMENTS

| | | |
|---|---|---|
| JP | 63-131173 | 8/1988 |
| JP | 1-137574 | 9/1989 |
| JP | 3-157076 | 7/1991 |
| JP | 4-70075 | 3/1992 |

\* cited by examiner

Primary Examiner—James O. Hansen
(74) Attorney, Agent, or Firm—Finnegan, Henderson, Farabow, Garrett & Dunner, L.L.P.

(57) ABSTRACT

A stand of the swing type is held in a battery compartment cover which has a notch and covers the case and a battery-holding portion, in order to flatten the back surface of the case of a portable liquid crystal display device, so that the presence of batteries in the battery-holding portion can be confirmed without opening the battery compartment cover. The swing type battery compartment cover eliminates undesired space between the battery compartment cover and the batteries. The thickness of the battery compartment cover can be decreased, contributing to decreasing the thickness of the device. A recessed portion is formed on the front surface of the case in an expanded manner for mounting the windshield surrounding the liquid crystal display window, and an ornamental plate is mounted surrounding the windshield that protects the display window to enhance the value of the device. When the windshield is mounted on the recessed portion, the back surface of the windshield comes into intimate contact with a continuous protuberance formed on the recessed portion that surrounds the display window.

20 Claims, 30 Drawing Sheets

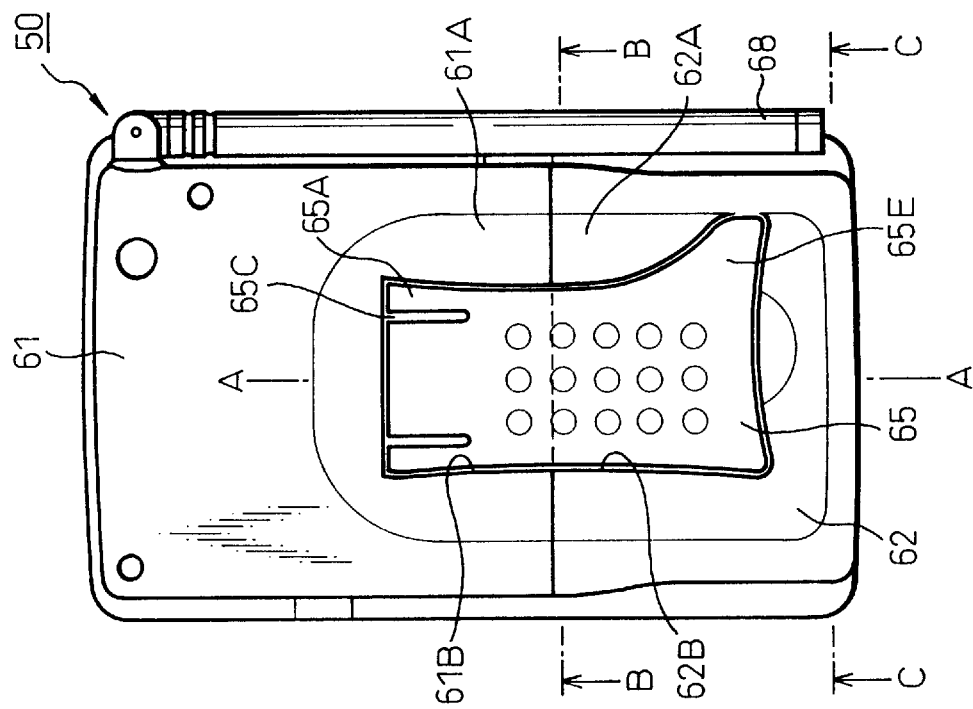
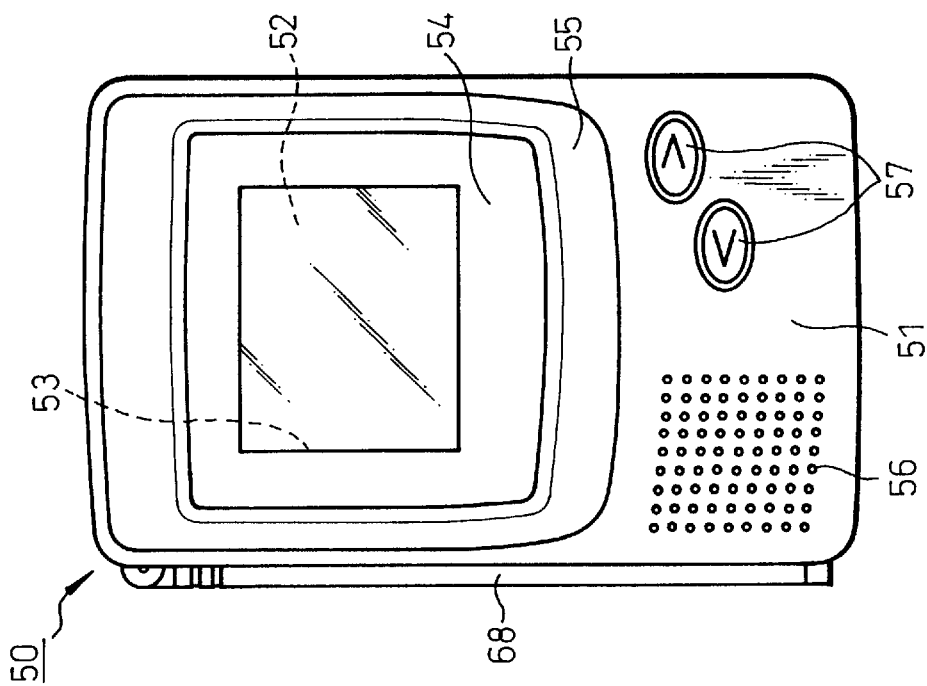

PORTABLE LIQUID CRYSTAL DISPLAY DEVICE

TECHNICAL FIELD

The present invention relates to a portable liquid crystal display device and, particularly, to a portable liquid crystal display device used for a portable liquid crystal television receiver, a portable liquid crystal monitor and the like devices. If described in further detail, the invention relates to the structure of a case such as a battery compartment cover or a stand for a portable liquid crystal display device.

BACKGROUND ART

Portable liquid crystal display devices for displaying image on a liquid crystal panel are light in weight, small in size, small in thickness and consume decreased amounts of electric power compared to the conventional display devices that display image on a cathode-ray tube. Because of these advantages, therefore, the portable liquid crystal display devices have, in recent years, been used in a variety of fields as multi-media equipment such as monitors, television receivers, PDAS (personal digital assistants) and the like.

In many cases, such a small portable liquid crystal display device is better watched when the image display unit is slightly tilted upward from the uprightly erected state. Therefore, the case of the portable liquid crystal display device is usually provided, on its back surface side, with a stand for standing the liquid crystal display device in a tilted state. The stand is of the swing type having a rotary shaft provided at one end thereof, and the rotary shaft is attached to a bracket provided on the back surface of the case or to a shaft hole. As required, the stand is drawn out with a swinging motion from the case, and is held in a state of being opened by a predetermined angle, so that the display device is stood in a tilted state. Furthermore, a recessed portion for holding the stand is often formed in the case on the back surface side. In such a display device, a stand that is not in use is held integrally with the case.

Batterys have been used as a power source for the portable liquid crystal display device and, hence, a battery-holding portion is formed in the case on the back surface side for holding the batterys. Usually, the battery-holding portion is covered with a battery compartment cover. At the time of renewing the batterys only, the battery compartment cover is removed from the case to open the battery-holding portion and to renew the batterys. The battery compartment cover usually slides with respect to the case.

It has been attempted to realize the portable liquid crystal display device in a small size and in a reduced weight, so that it can be easily carried. As for decreasing the size, in particular, efforts have been made to decrease the thickness as it is a tendency to increase the size of the liquid crystal display screen.

When the portable liquid crystal display device is realized in a decreased thickness, however, a problem arises in that the battery compartment cover and the stand provided in the back surface of the case interfere with each other. When there is a margin in the area on the back surface of the case, the battery compartment cover and the stand can be located on different positions in the direction of the surface as disclosed in, for example, Japanese Unexamined Utility Model Publication (Kokai) No. 63-131173. As the margin in the area on the back surface of the case decreases, however, the stand that is closed tends to overlap the battery compartment cover, making it difficult to decrease the thickness of the device.

When the liquid crystal display device is not operated for extended periods of time with the batterys loaded in the battery-holding portion, the battery-holding portion and the vicinities thereof are adversely affected by the corrosion of the batterys. When the liquid crystal display device is not used for extended periods of time, therefore, the user often removes the batterys from the battery-holding portion. However, if the user goes out carrying the liquid crystal display device with him without the batterys in the battery-holding portion, the liquid crystal display device will not work.

To prevent this, a portable liquid crystal display device has been proposed in which a window is formed in the battery compartment cover enabling the batterys in the battery-holding portion to be viewed from the external side without the need of opening the battery compartment cover (Japanese Unexamined Patent Publication (Kokai) No. 10-123488). According to this portable liquid crystal display device, furthermore, it has been attempted to decrease the thickness by overlapping the stand on the battery compartment cover.

In this portable liquid crystal display device, however, the window formed in the battery compartment cover is located at a portion where the stand and the battery compartment cover are overlapped one upon the other, and the presence of the batterys cannot be confirmed unless the stand is withdrawn from the case.

Furthermore, technology has been developed to decrease the thickness of the portable liquid crystal display device so as to approach, as much as possible, the diameter of the dry batterys which constitute the power source. This structure in which a dent is formed in the case on the back surface side thereof to hold the stand in the dent, pertains to the attempt for decreasing the thickness of the display device.

In the conventional portable liquid crystal display device, however, the battery compartment cover that slides relative to the case, as described above, makes it difficult to decrease the thickness. That is, the thickness from the outermost end surface of the stand to the side surfaces of the batterys held in the case, equals the sum of the thickness of the stand, the thickness of the battery compartment cover, and a gap to prevent an engaging hook from interfering with the batterys at the time when the battery compartment cover is slid, the engaging hook being provided on the inside of the battery compartment cover for securing the battery compartment cover to the case. This gap prevents decreasing the thickness.

Moreover, when attached to the case, the battery compartment cover may develop a play as it can be strongly depressed repetitively by finger tips during the use for extended periods of time, causing the engaging hook to be damaged or worn out, or due to dispersion in the quality of the engaging hook during the molding.

Furthermore, the above-mentioned stand is attached to the case by the rotary shafts at the ends of deflection arms formed by kerfs. When the stand is abruptly drawn out from the case or when the display device is accidentally fallen with its stand being drawn out, cracks may develop at the bottoms of the kerfs often resulting in damage.

In a practical display device, furthermore, the batterys are not, in many cases, arranged at the central portion of the display device, and the center of gravity of the device is often greatly deviated toward either the right or the left. Besides, when an antenna provided on one side on the back surface of the case of the display device is extended, the center of gravity of the display device is further greatly deviated depending upon the direction in which the antenna extends. Therefore, the position and shape of the stand attached to the case must be so contrived that the display device does not fall sideways even in the above-mentioned cases.

In the above-mentioned portable liquid crystal display device, on the other hand, a display window for viewing the image displayed on the liquid crystal panel is formed on the front surface side of the case, and a windshield (transparent dust cover) is usually arranged in the periphery of the display window to protect the liquid crystal panel. The windshield is in the form of a flat plate being made of a transparent glass or resin. The windshield is often printed to indicate display channels and the like.

In order that the windshield does not protrude beyond the case, a recessed portion is formed along the periphery of the display window for arranging the windshield, the recessed portion being lower than the surface of the case. The windshield is mounted in the recessed portion using an adhesive or a double-sided adhesive sheet, so that the surface thereof is nearly flush with the surface of the case.

According to the prior art, however, it is not possible to incorporate the windshield in the windshield-arranging portion unless the recessed portion formed in the case for arranging the windshield has a size larger than the size of the windshield. Therefore, a gap inevitably develops between the windshield that is incorporated and the case. Besides, the adhesive must be applied without break onto the periphery of the display window or the double-sided adhesive sheet must be arranged without break, so that dust and dirt will not infiltrate into the case through the gap.

Besides, in order to arrange the double-sided adhesive sheet without break around the periphery of the display window, the rectangular internal part of the double-sided adhesive sheet must be cut in a similar figure and must be removed to form a frame. The double-sided adhesive sheet of the portion that is removed is discarded, which is a waste and accounts for an increase in the cost of production.

Furthermore, when the liquid crystal display device is to be disassembled for a repair work, the windshield that is firmly secured to the recessed portion for arranging the windshield by the double-sided adhesive sheet of the shape of a frame, requires an increased amount of work and time for removal.

In order to impart high-grade feeling to the portable liquid crystal display device, furthermore, an ornamental member is often provided to emphasize color tone and touch feeling by using a member different from that of the case around the display window. However, an effective constitution has not yet been proposed for arranging the ornamental member around the display window to improve the quality of appearance of the portable liquid crystal display device and for supporting the windshield arranged around the display window on the case by using the ornamental member.

DISCLOSURE OF THE INVENTION

A first object of the present invention is to provide a portable liquid crystal display device in which a battery compartment cover and a stand of the swing type share the area on the back surface of the case, and the surface of the battery compartment cover is nearly in flush with the surface of the stand which is in its closed state.

The invention further provides a portable liquid crystal display device which enables the presence of batterys in the battery-holding portion provided in the back surface of the case to be viewed from the external side even in a state where the battery compartment cover remains closed.

A second object of the present invention is to provide a portable liquid crystal display device which enables the thickness of the battery compartment cover to be decreased while maintaining the strength of the battery compartment cover, eliminates the gap for preventing the interference between the engaging hook attached to the battery compartment cover and the batterys, makes it possible to decrease the thickness of the device as a whole so that it can be more easily carried, and prevents the occurrence of play between the battery compartment cover and the case caused by dispersion in the quality of the battery compartment cover during the molding.

A third object of the present invention is to provide a portable liquid crystal display device having a stand which features improved durability and maintains the portable liquid crystal display device in a state where it falls difficultly.

A fourth object of the present invention is to provide a portable liquid crystal display device having a windshield-mounting structure which does not permit dust and dirt to infiltrate onto the surface of the liquid crystal panel from the windshield provided around the periphery of the display window of the liquid crystal display device, and uses the double-sided adhesive sheet in a decreased amount for mounting the windshield on the case, contributing to decreasing the cost.

A fifth object of the present invention is to obtain a portable liquid crystal display device which exhibits improved appearance, and enables an ornamental plate to be arranged around the display window, the ornamental plate being capable of incorporating the windshield on inside thereof.

In order to accomplish the above-mentioned first object according to a first aspect of the present invention, there is provided a portable liquid crystal display device powered by batterys, comprising:

a case having, on the back surface side thereof, a battery-holding portion which is a recessed portion for holding the batterys;

a battery compartment cover of the slide type for opening and closing an opening for replacing the batterys in the battery-holding portion; and a stand of the swing type supported by a shaft to swing relative to the case and to move between a state where it is opened by a predetermined angle with a swinging motion from the back surface of the case and a state where it is closed onto the back surface side of the case;

wherein a stand shaft support is provided in a portion of the case to support the stand in a swinging manner; and a notch is formed in a portion of the battery compartment cover so as to be closed when the stand is closed.

With the case and the battery compartment cover being provided with recessed portions for holding the stand, the outer surface of the stand can be brought to be nearly flush with the outer surfaces of the case and the battery compartment cover when the stand is closed, and the back surface of the device can be flattened. In the state where the stand is closed, furthermore, the interior of the battery-holding portion can be viewed from the external side through the notch without the need of opening the battery compartment cover.

In order to accomplish the above-mentioned second object according to a second aspect of the present invention, there is provided a portable liquid crystal display device powered by batterys, comprising:

a case having, on the back surface side thereof, a battery-holding portion which is a recessed portion for holding the batterys;

a battery compartment cover for opening and closing an opening for replacing the batterys in the battery-holding portion; and a stand of the swing type supported by a shaft to swing relative to the case and to move between a state where it is opened by a predetermined angle with a swinging motion from the back surface of the case and a state where it is closed onto the back surface side of the case;

wherein as engaging protrusions formed on an upper end side of the battery compartment cover are inserted in engaging holes formed in an end of the battery-holding portion of the case, the lower end of the battery compartment cover swings with the engaging protrusion as a support shaft, and the battery-holding portion is opened and closed as the battery compartment cover swings open and close.

With the battery compartment cover being allowed to swing, no wasteful gap needs be maintained between the battery compartment cover and the batterys, and the thickness of the device is decreased to improve the portability. Moreover, since the thickness of the battery compartment cover is decreased yet maintains its strength, the portability of the device is further improved. Furthermore, guides for attaching the battery compartment cover are formed on the walls by the sides of the battery-holding portion of the case, and plural pairs of engaging protrusions and engaging holes are formed in the battery compartment cover and at required portions of the case to restrict the position of the battery compartment cover. This makes it possible to prevent the occurrence of play between the battery compartment cover and the lower case caused by wear or by dispersion in the quality during the molding.

In order to accomplish the above-mentioned third object according to a third aspect of the present invention, there is provided a portable liquid crystal display device of the first and second aspects, wherein the stand is provided with deflection arms formed by kerfs, and wherein holes of approximately a circular shape larger than at least the width of the kerfs are formed at points where stress concentrates in the bottom portion of the kerfs.

In this case, the width of the stand on the side of the free end may be larger than the width of the stand on the side of an end that can be rotated. Otherwise, the free end side of the stand may be set to be asymmetrical with respect to a center line on one end side that can be rotated of the stand. Owing to this constitution, the stand is less likely to be broken, and the device becomes less likely to fall sideways in a state where the stand is drawn out.

In order to accomplish the above-mentioned fourth object according to a fourth aspect of the present invention, there is provided a portable liquid crystal display device in which a display window for viewing a display on an incorporated liquid crystal display panel is formed in a case, and a windshield is arranged in a recessed portion for arranging the windshield formed in a recessed manner in the case surrounding the display window, wherein at least one row of rib-like protuberance is continuously formed to surround the display window of the recessed portion for arranging the windshield, the protuberance protruding by a predetermined height from the recessed portion, and the back surface of the windshield comes into contact with the rib-like protuberance when the windshield is mounted on the recessed portion by a mounting means.

The mounting means may be provided on at least two places on the recessed portion on the outer side of the rib-like protuberance, on the inner side of the rib-like protuberance, or between the protuberance and the protuberance, sandwiching the display window therebetween. This prevents dust and dirt from infiltrating into the display window, and the decreased number of mounting means enables the cost to be decreased.

In order to accomplish the above-mentioned fifth object according to a fifth aspect of the present invention, there is provided a portable liquid crystal display device in which a display window for viewing a display on an incorporated liquid crystal display panel is formed in a case, and a windshield is arranged in a recessed portion for arranging the windshield formed in a recessed manner in the case surrounding the display window, wherein an ornamental member of a color tone different from the color tone of the case is arranged to surround the windshield.

The recessed portion for arranging the ornamental member in the portable liquid crystal display device can be provided in common surrounding the recessed portion for arranging the windshield, at least one row of rib-like protuberances is continuously formed in the recessed portion surrounding the display window, the rib-like protuberance protruding by a predetermined height from the recessed portion, bed plates for placing an ornamental member are formed on the recessed portion on the outer sides of the rib-like protuberance, the bed plates having a height larger than the height of the rib-like protuberance from the recessed portion but smaller than the height of from the recessed portion to the outer surface of the case, the back surface of the windshield comes into contact with the rib-like protuberance when the windshield is mounted on the recessed portion by the mounting means, and the ornamental member is mounted on the bed plates by the mounting means.

Furthermore, a first inclined surface inclined toward the bottom surface of the recessed portion of the case is formed along at least one edge of the recessed portion, a second inclined surface opposed to the first inclined surface is formed on a portion opposed to the first inclined surface of the back surface of the ornamental member near the outer periphery thereof, and the ornamental member is mounted on the recessed portion in a state where the second inclined surface of the ornamental member is overlapped on the first inclined surface. Owing to this constitution, no conspicuous gap appears between the case and the ornamental member.

In this case, a visor portion is formed at the edge on the outer peripheral side of the second inclined surface of the ornamental member so as to slightly protrude outward from the second inclined surface, and is overlapped on the outer surface near the recessed portion of the case at the time when the ornamental member is mounted on the case. Thus, a step between the ornamental member and the case becomes less conspicuous.

BRIEF DESCRIPTION OF DRAWINGS

The above and other objects as well as features and advantages of the invention will be described below in detail by way of embodiments with reference to the accompanying drawings, in which:

FIG. 16A is a front view of the portable liquid crystal display device according to a second embodiment of the present invention;

FIG. 16B is a back view of the portable liquid crystal display device according to the second embodiment of the present invention;

BEST MODE FOR CARRYING OUT THE INVENTION

Prior to describing the embodiment of the invention, the structure of the case of the portable liquid crystal display device which is a prerequisite technology to the invention and problems inherent in the case of this structure will be described with reference to FIGS. 1 to 10.

Figure 1:
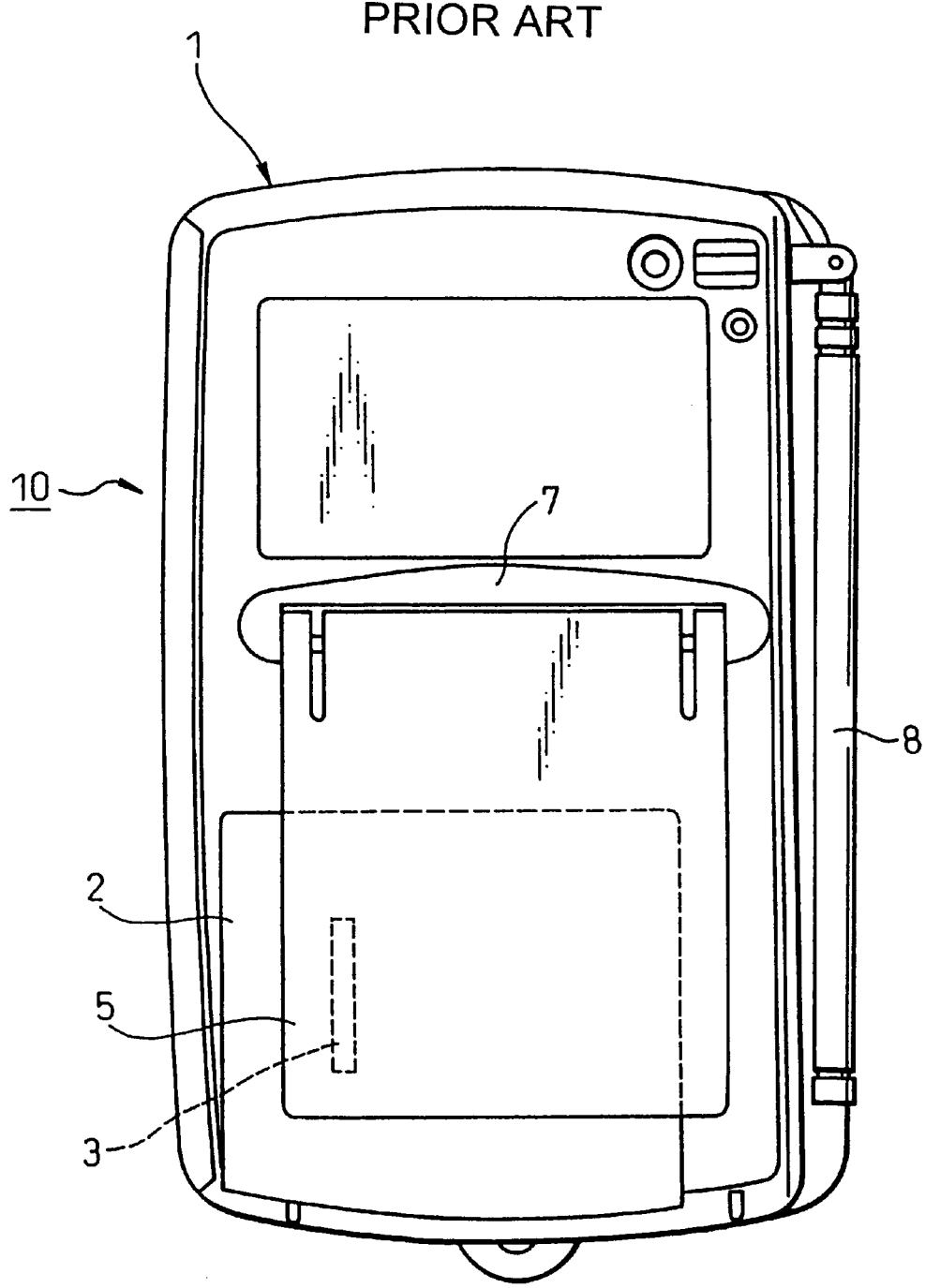
FIG. 1 is a back view illustrating the constitution of a conventional portable liquid crystal display device on the back surface side of the case.

FIG. 1 shows the back surface side of a case 1 of a portable liquid crystal display device 10 disclosed in Japanese Unexamined Patent Publication (Kokai) No. 10-123488. A battery compartment cover 2 of the slide type is provided on the back surface side of the case 1, and has a window 3 for confirming the presence of batterys therein. Furthermore, a stand 5 is provided on the back surface side of the case 1 for standing the portable liquid crystal display device 10 in a tilted manner. One end of the stand 5 is pivotally attached to a bracket 7 provided in a middle portion on the back surface side of the case 1. The stand 5 can be drawn out with a swinging motion from the case 1. Reference numeral 8 denotes an antenna.

In the portable liquid crystal display device 10 shown in FIG. 1, the lower end of the stand 7 is overlapped on the battery compartment cover 2, so that the battery compartment cover 2 and the swing-type stand 5 can exist together even though the area is limited on the back surface of the case 1 as a result of decreasing the size.

Figure 2:
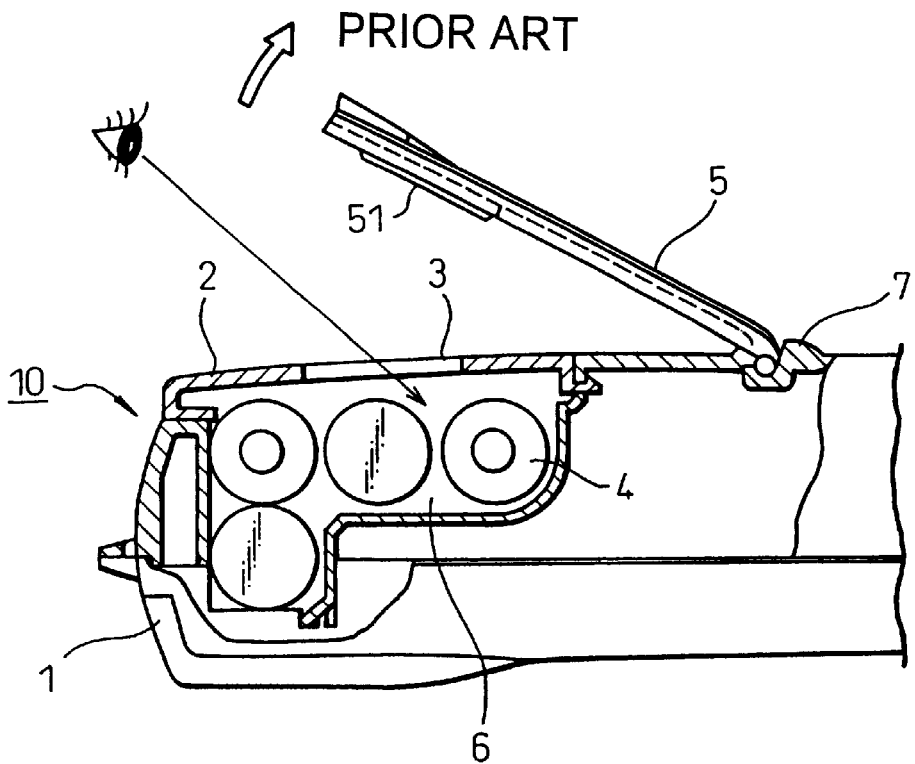
FIG. 2 is a partly cut-away side view of FIG. 1 wherein a portion of the lower side is cut away from the stand-mounting portion of the case, and illustrates a state where the stand is drawn out.

FIG. 2 illustrates the constitution of the case 1 by cutting away a portion on the lower side of the bracket 7 of the case 1. In order to make sure from the external side whether the batterys 4 have been held in the battery-holding portion 6 without opening the battery compartment cover 2, the stand 5 must be drawn out from the case 1 as shown in FIG. 2. Then, a window 3 covered by the stand 5 appears. The presence of the batteries 4 inside the battery compartment cover 2 can be confirmed through the window 3.

Figure 3:
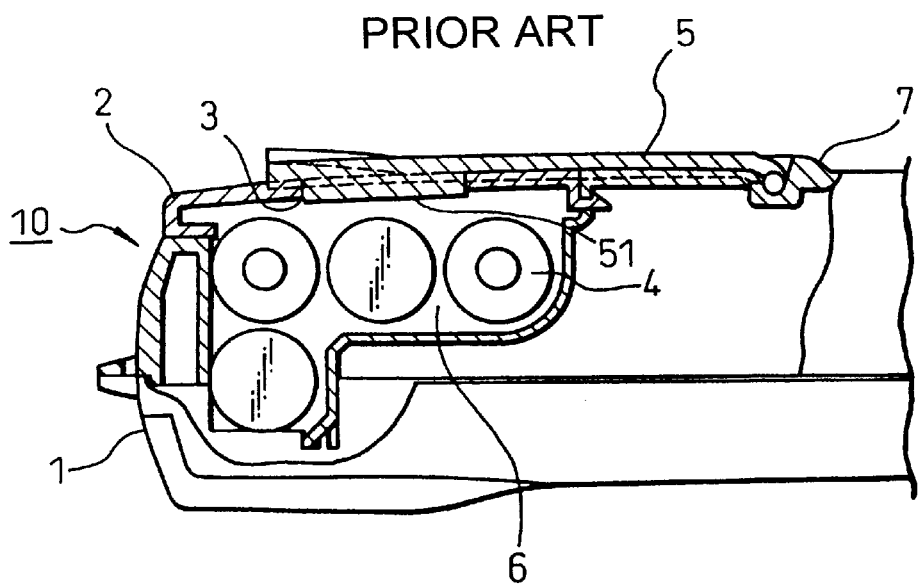
FIG. 3 is a partly cut-away side view of FIG. 1 wherein a portion of the lower side is cut away from the stand-mounting portion of the case, and illustrates a state where the stand is held.

Upon forming a protrusion 51 having the same shape as the shape of the window 3 on the inside of the stand 5, furthermore, the window 3 for confirming the batterys can be closed by the protrusion 51 as shown in FIG. 3 when the stand 5 pivotally attached to the bracket 7 of the case 1 is closed being overlapped on the battery compartment cover 2. In a state where the stand 5 is closed, therefore, dust and dirt are prevented from infiltrating into the battery-holding portion 6 through the window 3, and accidents such as poor contact of the batterys 4 and short-circuit are prevented.

According to the portable liquid crystal display device 10 disclosed in Japanese Unexamined Patent Publication (Kokai) No. 10-123488, however, the surface of the battery compartment cover 2 is nearly flush with the surface of the case 1 as shown in FIG. 2. Therefore, the stand 5 overlapped thereon protrudes beyond the surface of the case 1 as shown in FIG. 3, making it difficult to decrease the thickness of the portable liquid crystal display device 10. Besides, there remains a problem in that the presence of the batterys 4 in the battery-holding portion 6 cannot be confirmed through the window 3 unless the stand 5 is drawn out from the case 1 as shown in FIG. 2. Moreover, since the stand 5 protrudes beyond the surface of the case 1, the shape of the whole device cannot be freely designed.

Figure 4:
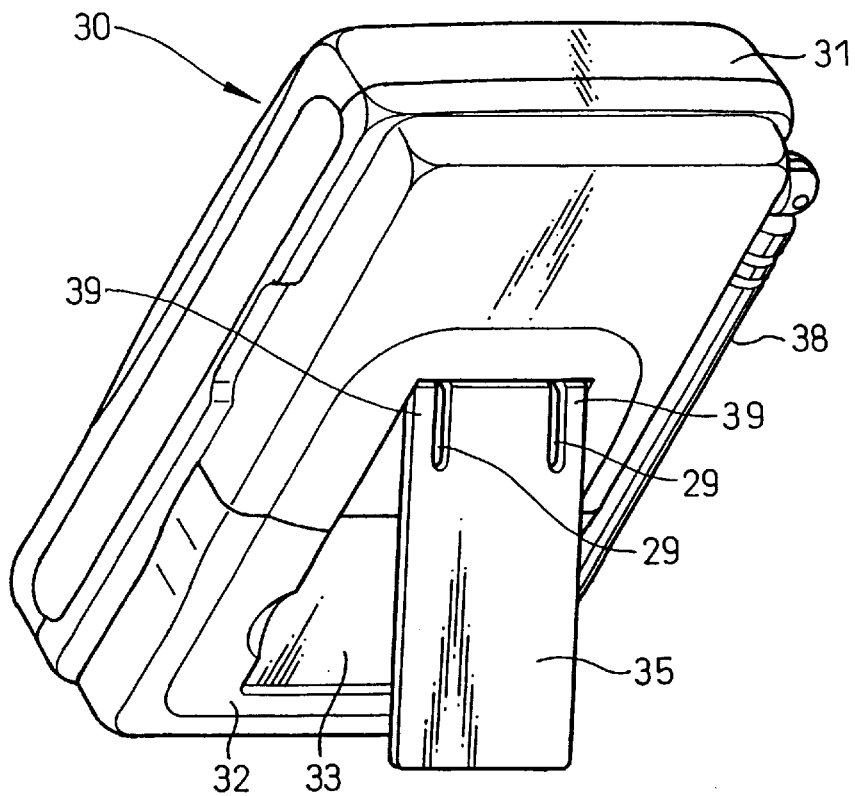
FIG. 4 is a perspective view of a conventional portable liquid crystal display device having a recessed portion for holding the stand in the back surface of the case as viewed from the back surface side.

To cope with a problem in that the stand 5 in its closed state protrudes beyond the case 1, Japanese Unexamined Utility Model Publication (Kokai) No. 3-90268 discloses a technology according to which a recessed portion for holding the stand 5 is formed in the body, and the stand 5 that is not in use is held in the recessed portion, so that the stand 5 in its closed state will not protrude beyond the body. FIG. 4 illustrates the constitution of the case and the stand when this technology is applied to a portable liquid crystal display device.

In a portable liquid crystal display device 30 shown in FIG. 4, a recessed portion 33 for holding the stand is formed in the case 31 on the back surface side thereof, and rotary shafts of a stand 35 are attached to shaft holes (not shown) formed in the side surfaces of the recessed portion 33. To stand the portable liquid crystal display device 30, the stand 35 is drawn out with a swinging motion from the case 31 as shown in FIG. 4. In its closed state, the stand 35 is held in the recessed portion 33. In the closed state, therefore, the outer surface of the stand 35 is nearly in flush with the surface of the case 31.

Figure 5:
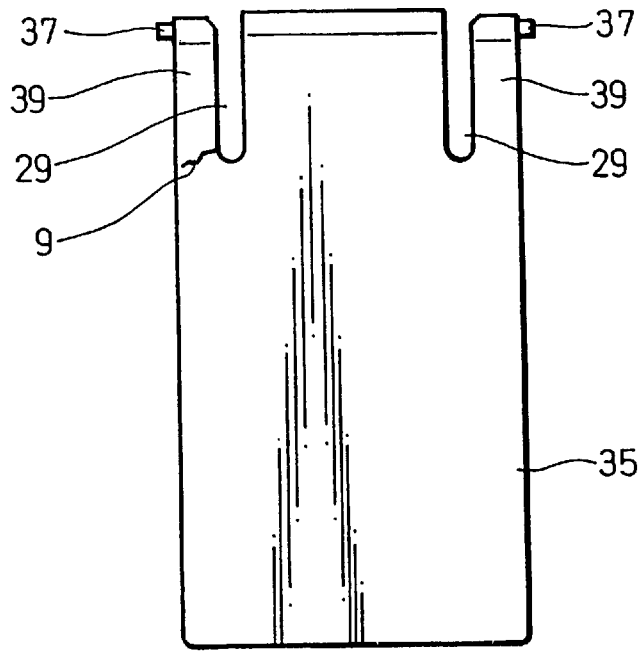
FIG. 5 is a plan view illustrating the constitution of the stand of FIG. 4.

FIG. 5 shows the shape of the stand 35 described with reference to FIG. 4. Mounting shafts 37 protrude on both sides at one end of the stand 35 and are inserted in the shaft holes. Reference numeral 38 denotes an antenna. On the insides of the mounting shafts 37, there are formed a pair of kerfs 29 in the stand 35 in parallel in the lengthwise direction. Due to the kerfs 29, deflection arms 39 are formed on one end side of the stand 35. To insert the mounting shafts 37 in the shaft holes, the deflection arms 39 may be deflected toward the inside of the stand.

When a stress is exerted in a direction to force down the portable liquid crystal display device 30 that is standing in a tilted manner with the stand 35 being drawn out from the recessed portion 33, the stand 35 is removed from the case 31 owing to the deflection of the deflection arms 39. Therefore, the mounting shafts 37 of the stand 35 are not broken.

According to experiment conducted by the present inventors, however, when a large load is applied to the deflection arms 39 such as when the stand 35 is abruptly drawn out into a state shown in FIG. 4 or when the portable liquid crystal display device 30 accidentally falls with its stand 35 drawn out, cracks 9 may develop at the root portions of the deflection arms 39 as shown in FIG. 5. In the worst case, the stand 35 is broken.

In the practical portable liquid crystal display device 30, furthermore, the batterys held in the case 31 are not necessarily arranged at the central portion of the portable liquid crystal display device 30 as this is limited by design requirements of the case 31. In such a case, the center of gravity of the portable liquid crystal display device 30 is greatly deviated toward either to the right or to the left. Besides, when the antenna 38, provided at an end of the case 31, is extended sideward as shown in FIG. 6, the center of gravity of the portable liquid crystal display device 30 greatly deviates toward the direction in which the antenna 38 is extended.

Figure 6:
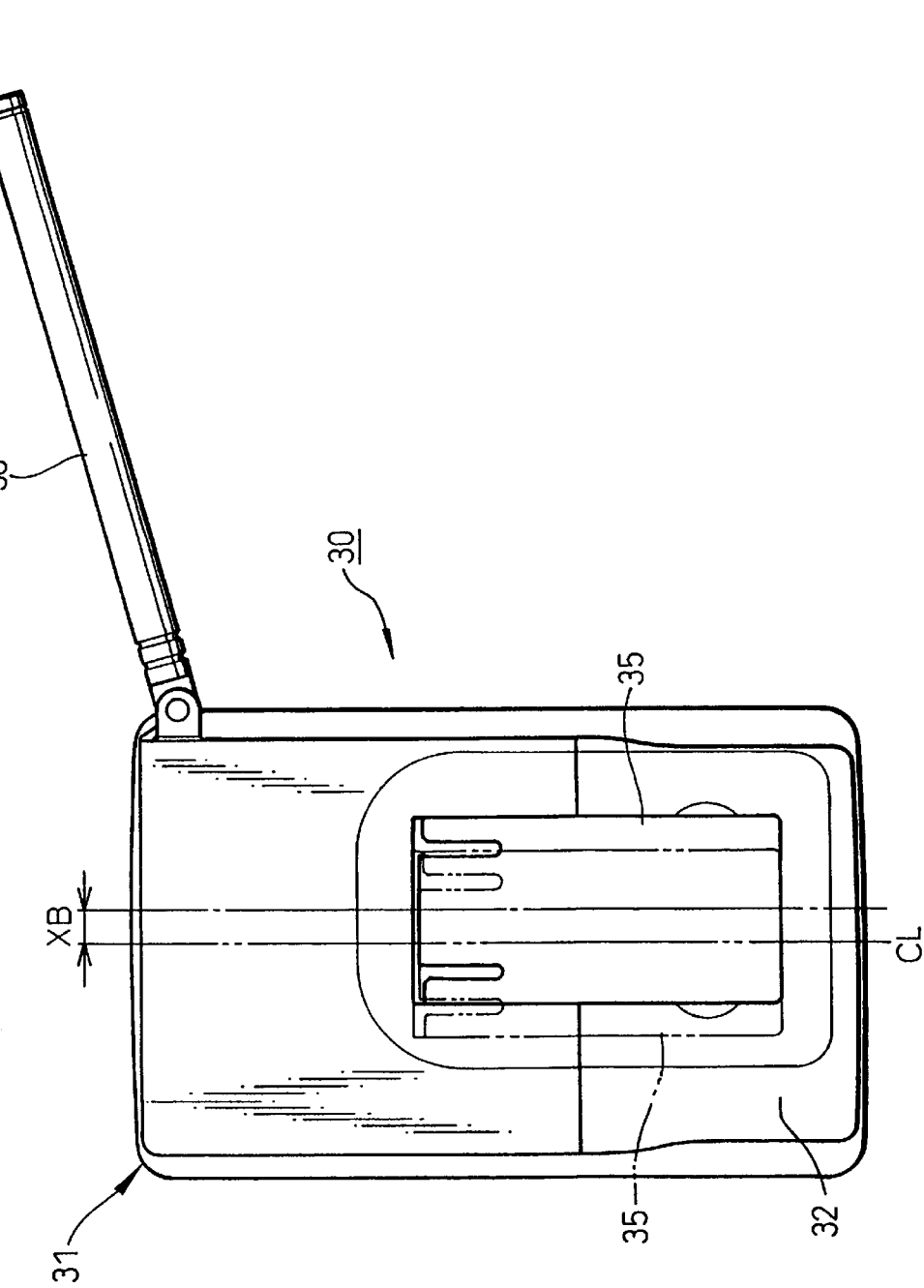
FIG. 6 is a back view illustrating the portable liquid crystal display device shown in FIG. 4 when the position for mounting the stand is shifted toward the side of the antenna.

To cope with the deviation in the center of gravity, a method has been employed as shown in FIG. 6 by which the position for mounting the stand 35 is deviated by a predetermined distance XB from the center line CL of the device by taking into consideration the direction in which the antenna 38 is likely to be extended and in which the center of gravity is likely to be shifted.

This makes it possible to stabilize the portable liquid crystal display device 30 in a state where the stand 35 is drawn out so that it will not fall in the direction in which the antenna 38 is extended. However, this method involves a problem in that a great limitation is imposed on designing the back surface portions of the display device.

Furthermore, when the battery compartment cover 32 is of the slide type in the portable liquid crystal display device 30 shown in FIG. 4, there arises a problem in that the thickness of the portable liquid crystal display device 30 increases. This will be described with reference to FIG. 7.

Figure 7:
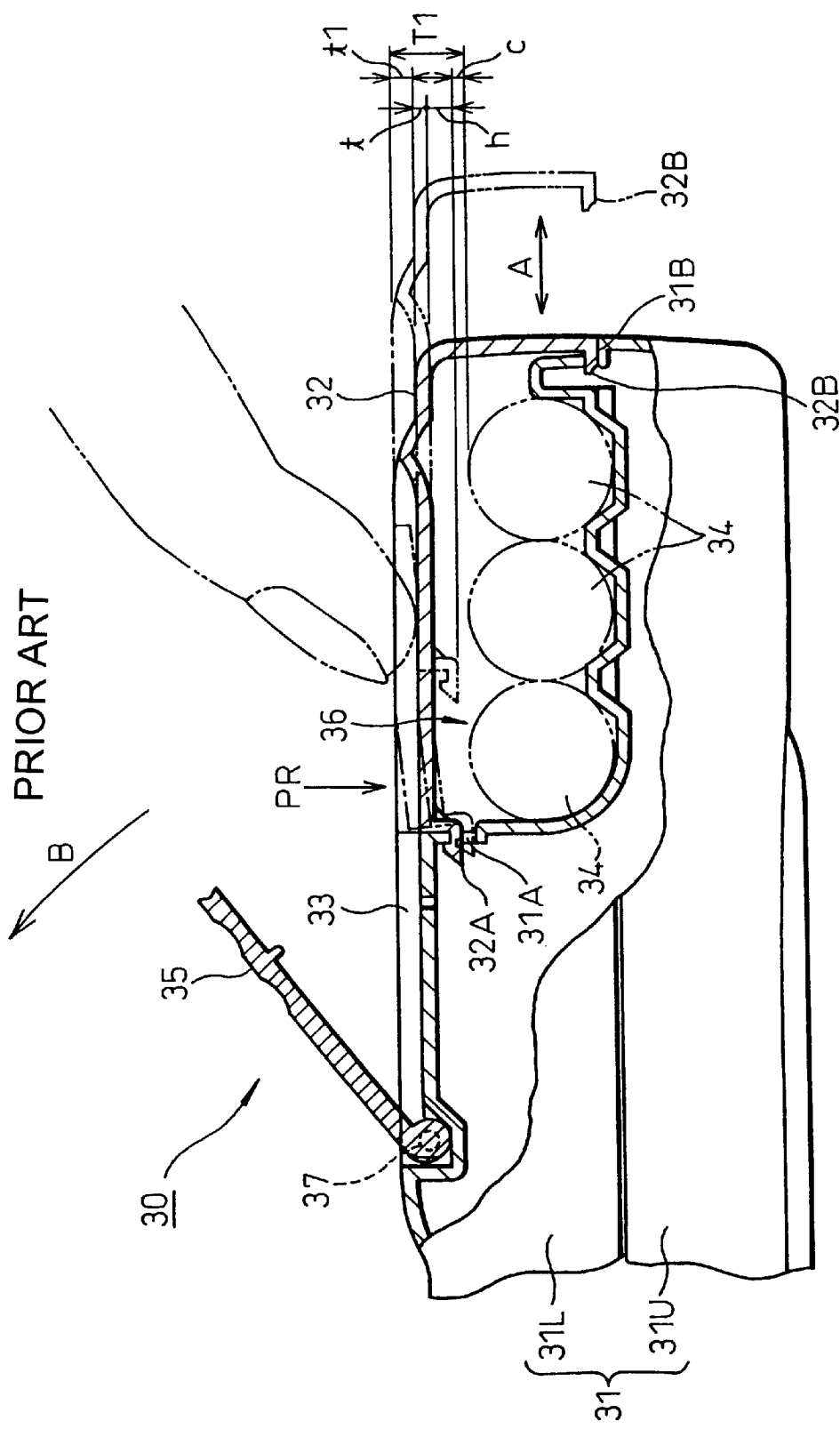
FIG. 7 is a partial side view of the portable liquid crystal display device shown in FIG. 4, and illustrates, in a cut-away manner, a recessed portion for holding the stand and a battery-holding portion.

FIG. 7 is a side view illustrating a major portion by cutting away part of the recessed portion 33 for holding the stand in the portable liquid crystal display device 30 shown in FIG. 4. A case 31 includes an upper case 31U having a display window (not shown), a lower case 31L having a battery-holding portion 36 and a recessed portion 33 for holding the stand that are formed integrally together, a stand 35 rotatably attached to the recessed portion 33 for holding the stand, and a battery compartment cover 32 for covering the battery-holding portion 36.

A plurality of batterys are held in the battery-holding portion 36 formed in the lower case 31L integrally together. The battery compartment cover 32 covering the battery-holding portion 36 is detachably attached to the lower case 31L by being slid in the direction A. That is, to attach the battery compartment cover 32 to the lower case 31L, the battery compartment cover 32 is slid in the direction A from a position indicated by a two-dot chain line. Thus, the battery compartment cover 32 is attached to the lower case 31L as indicated by a solid line.

An engaging hook 32A and an engaging pawl 32B are formed on the lower surface on the front end side (left side in the drawing) of the battery compartment cover 32 and at a rear end thereof, for locking the battery compartment cover 32 to the lower case 31L. The engaging hook 32A is locked by being inserted in an engaging hole 31A formed in the lower case 31L, and the engaging pawl 32B is locked by being inserted in an engaging hole 31B formed in the lower case 31L, so that the battery compartment cover 32 is secured to the lower case 31L in a manner covering the battery-holding portion 36.

When a plurality of batterys 34 held in the battery-holding portion 36 are to be replaced, first, the stand 35 is drawn with a swinging motion in the direction B with the mounting shaft 37 as a center. Next, a surface portion near the engaging hook 32A of the battery compartment cover 32 is depressed by a finger tip in the direction PR to unlock the engaging hook 32A from the engaging hole 31A. In this state, the battery compartment cover 32 is slid in the direction A.

According to this procedure, the battery compartment cover 32 is removed from the lower case 31L enabling the plurality of batterys 34 to be replaced. After the plurality of batterys 34 are replaced, the battery compartment cover 32 is slid in the direction. A according to the reverse procedure and is fitted to the lower case 31L.

In the above-mentioned conventional portable liquid crystal display device 30 as shown in FIG. 7, the thickness T1 from the outermost end surface of the stand 35 to the side surfaces of the batterys 34 becomes the sum of a thickness t1 of the stand 35, a thickness t of the battery compartment cover 32, a height h of the engaging hook 32A protruded from the lower surface on the front end side of the battery compartment cover 32, and a gap c that is maintained so that the engaging hook 32A will not interfere with the batterys 34 when it slides. Therefore, the thickness T1 includes wasteful space defined by the height h and the gap c, causing the thickness of the lower case 31L to increase and making it difficult to decrease the thickness of the portable liquid crystal display device 30.

Furthermore, the battery compartment cover 32 is forcibly depressed repetitively by fingertips every time when the batterys 34 are to be replaced. After the portable liquid crystal display device 30 is used for extended periods of time, therefore, the engaging hook 32A and the engaging pawl 32B are likely to be damaged. Besides, the battery compartment cover 32 is secured to the lower case 31L relying only upon the engaging hook 32A and the engaging pawl 32B, and no engaging means has been provided for both side walls of the battery compartment cover 32. Therefore, due to dispersion in the quality of the battery compartment cover 32 at the time of molding and wear of the battery compartment cover 32 after used for extended periods of time, play develops when the battery compartment cover 32 is fitted to the lower case 31L.

Figure 8:
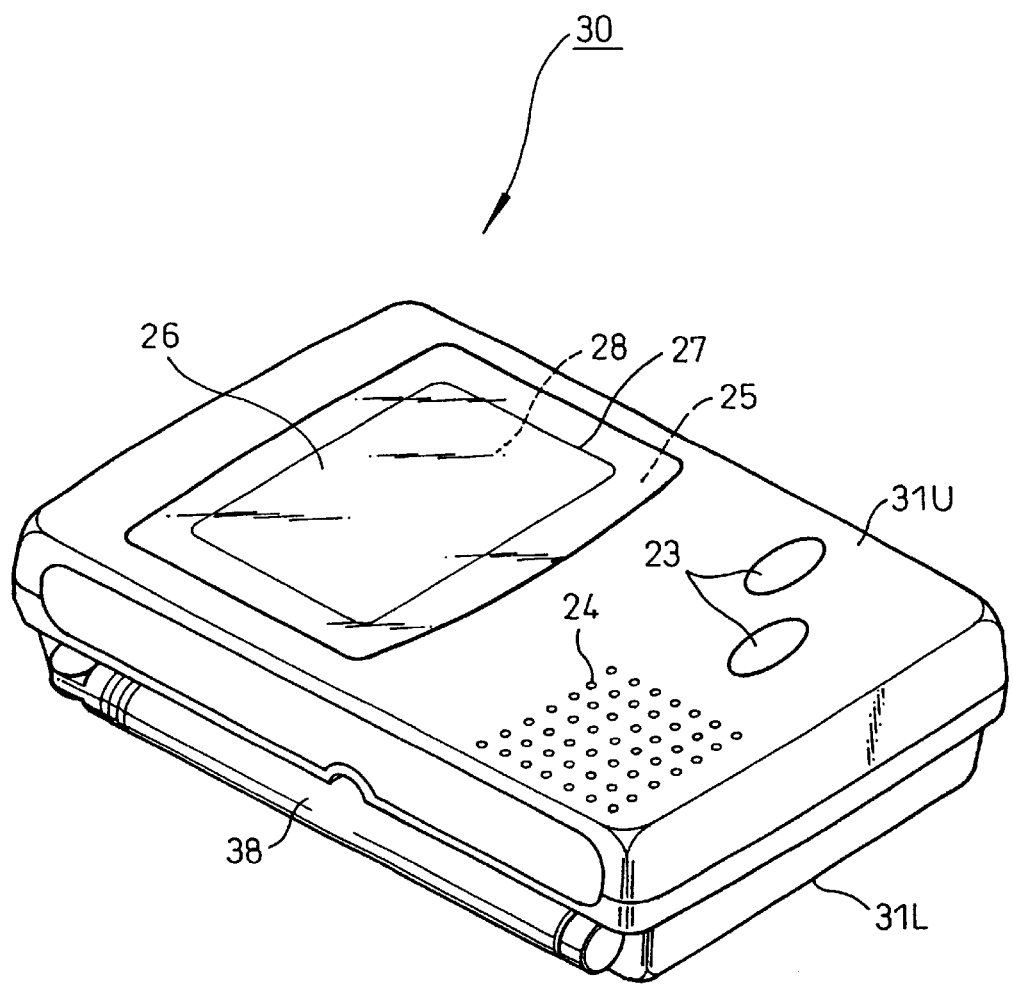
FIG. 8 is a perspective view of when the portable liquid crystal display device shown in FIG. 4 is seen from the side of the front surface where a liquid crystal display window is provided.

FIG. 8 illustrates the portable liquid crystal display device 30 shown in FIG. 4 of when it is viewed from the front surface side, i.e., from the side where a liquid crystal display window 27 is formed. On the front surface side of the portable liquid crystal display device 30, the display window 27 is formed in the upper case 31U so that an image displayed on a liquid crystal display panel 28 incorporated therein can be viewed.

A windshield 26 made of a transparent glass or resin is mounted on the front surface side of the display window 27 to protect the liquid crystal display panel 28. The windshield 26 is held in a recessed portion 25 for arranging the windshield formed surrounding the display window 27, and the upper surface of the windshield 26 is nearly in flush with the surface of the upper case 31U. Reference numeral 23 denotes buttons for selecting the channel, 24 denotes holes for emitting sound from a speaker, and 38 denotes an antenna attached to the lower case 31L.

Figure 9:
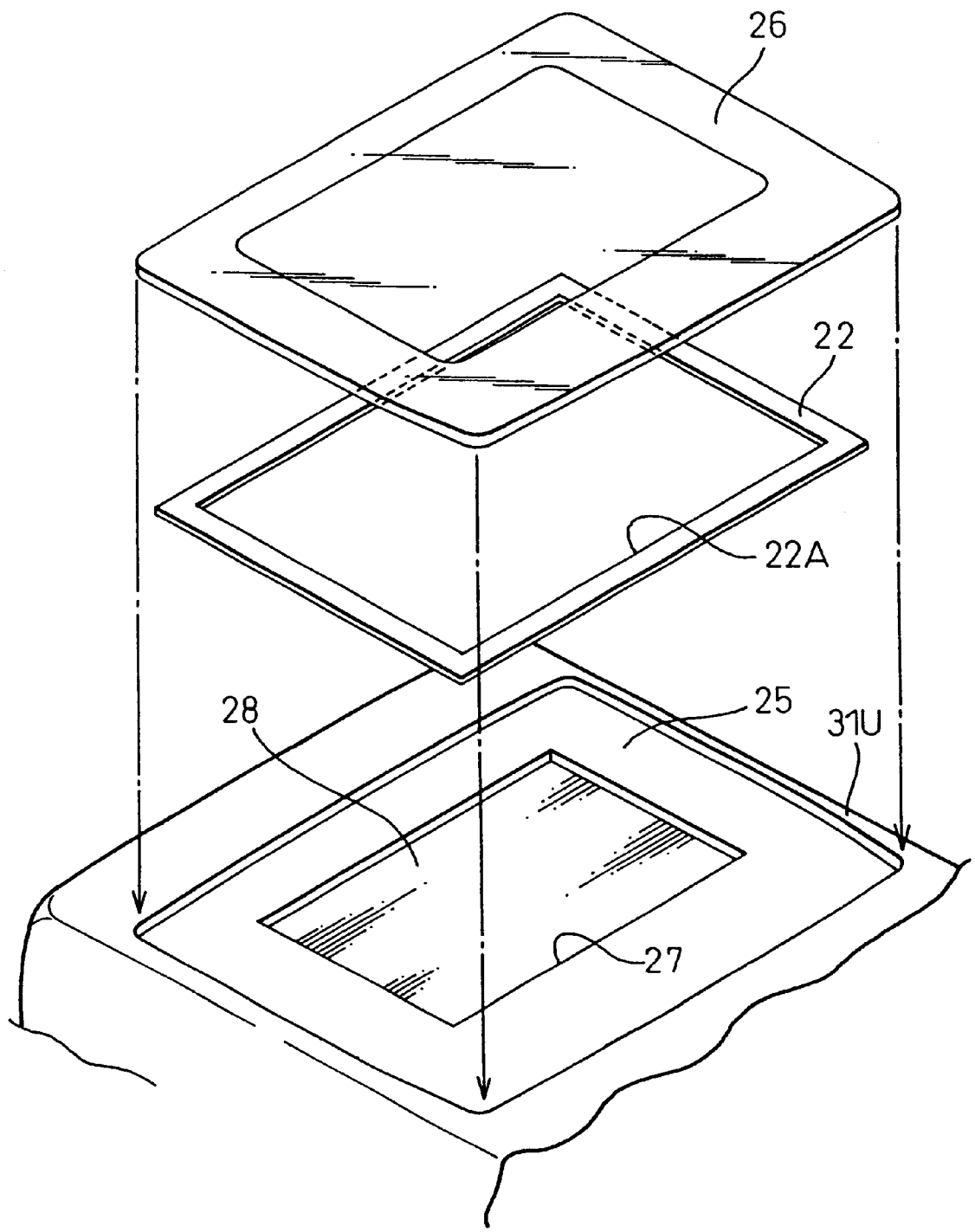
FIG. 9 is a perspective view of an assembly for illustrating a state where a windshield mounted on the display window of FIG. 8 is mounted on the upper case.

FIG. 9 is a view illustrating how to mount the windshield 26 of FIG. 8 on the upper case 31U. The recessed portion 25 for arranging the windshield 26 is formed surrounding the display window 27 of the upper case 31U. The recessed portion 25 has a size slightly larger than the size of the windshield. The liquid crystal display panel 28 is located at the back of the display window 27.

To mount the windshield 26 on the recessed portion 25, a rectangular rib-like double-sided adhesive sheet 22 having an inner size 22A larger than the size of the display window 27 is stuck to the recessed portion 25 in a manner that it is not overlapped on the display window 27, and the windshield 26 is placed and adhered thereon.

Figure 10:
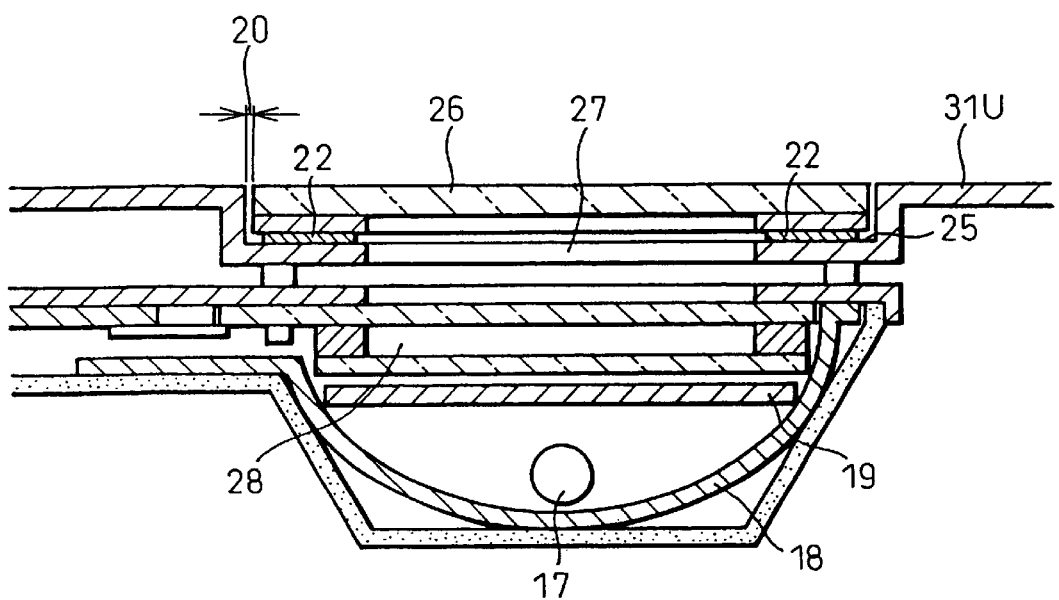
FIG. 10 is a partial longitudinal sectional view of a portion of the display window of the portable liquid crystal display device shown in FIG. 8.

FIG. 10 is a sectional view of a portion of the display window 27 of the portable liquid crystal display device 30 shown in FIG. 8. The flat plate-like windshield 26 made of a transparent glass or a resin is supported and secured in the recessed portion 25 which is formed to surround the display window 27 of the upper case 31U and is lower than the surface of the upper case 31U, by using the double-sided adhesive sheet 22 having a thickness of about 0.15 mm and a frame width of about 2 to 3 mm. The liquid crystal display panel 28 is provided in the upper case 31U on the inside of the display window 27, and a fluorescent lamp 17 equipped with a reflector 18 is disposed on the inside of the liquid crystal display panel 28. A light diffusion plate 19 is inserted between the fluorescent lamp 17 and the liquid crystal display panel 28.

According to the prior art as shown in FIG. 10, however, the device is assembled while maintaining a gap 20 between the upper case 31U and the windshield 26. Besides, the appearance is deteriorated if the gap 20 is not uniform. Besides, dust and dirt infiltrates into the display window 27 through the gap 20 to deteriorate the quality of display. To prevent this, therefore, the windshield 26 and the display window 27 are hermetically sealed together by using the double-sided adhesive sheet 22 of the shape of a rectangular frame. The rectangular rib-like double-sided adhesive sheet 22 is obtained by cutting off the rectangular double-sided adhesive sheet in a similar figure. The portion that is cut off is discarded, which is a waste of the material and drives up the cost.

Furthermore, when the portable liquid crystal display device 30 is to be disassembled for repair work, the windshield 26 must be removed from the upper case 31U. However, since the windshield 26 has been strongly adhered and secured over its four sides by the double-sided adhesive sheet 22, laborious work and time are required for removing the windshield 26.

It can be further contrived to mount an ornamental plate on a portion where the gap 20 is formed in order to eliminate the problem of poor appearance of the liquid crystal display device caused by the gap 20 that is formed along the boundary between the upper case 31U and the windshield 26. However, no effective means has heretofore been proposed for arranging an ornamental member of a material different from the upper case 31U to surround the windshield 26 in order to emphasize the color tone and touch feeling and, hence, to improve the appearance of the portable liquid crystal display device 30 and to impart high-grade feeling thereto.

That is, when the ornamental member is arranged to surround the windshield 26 according to the prior art, there arises a problem of disadvantage in the cost and yield of the portable liquid crystal display device 30.

In order to solve these problems, the best mode for carrying out the invention will now be described in detail by way of concrete embodiments with reference to the drawings.

Figure 11:
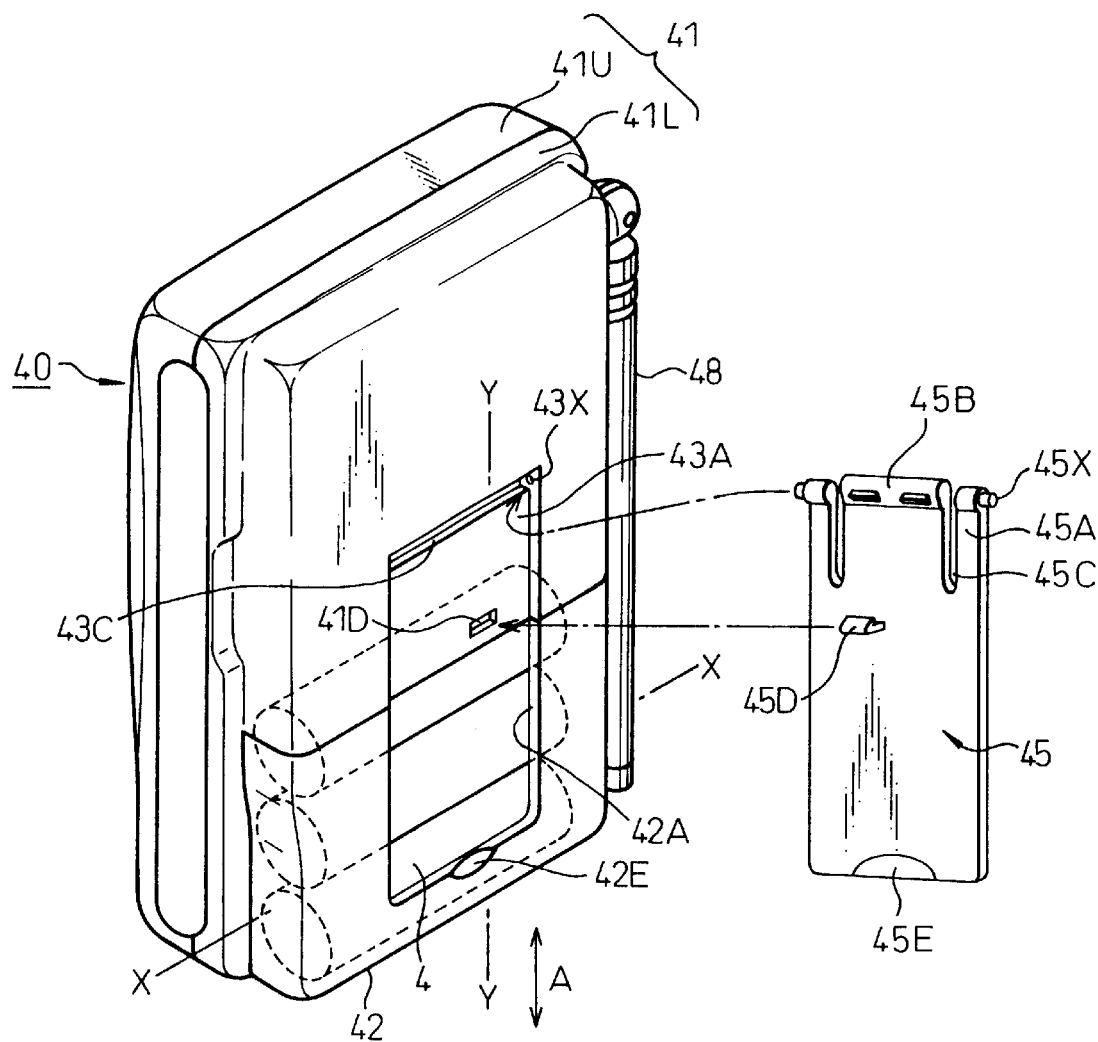
FIG. 11 is a perspective view of when a portable liquid crystal display device according to a first embodiment of the present invention is viewed from the back surface side.

FIG. 11 is a diagram showing a portable liquid crystal display device 40 according to a first embodiment of the present invention being viewed from the back surface. A case 41 of the portable liquid crystal display device 40 is constituted by an upper case 41U and a lower case 41L, and an antenna 48 is provided on the side surface of the lower case 41L. Furthermore, batterys 4 which form a power source are held in the lower part of the lower case 41L of the portable liquid crystal display device 40, and a battery compartment cover 42 is provided on the outer side of the batterys 4 in a manner that it can be removed for replacing the batterys. In this embodiment, the outer surface of the battery compartment cover 42 is flush with the outer surface of the lower case 41L. A notch 42A for holding a stand 45 that will be described later is formed in the central portion of the battery compartment cover 42, and an inclined surface 42E of a spherical shape is formed at the lower end of the notch 42A.

On the back surface of the lower case 41L is provided a stand 45 for standing the portable liquid crystal display device 40 in a tilted manner. FIG. 11, however, illustrates the stand 45 in a state where it is being removed. The stand 45 is a piece of plate with its one side being swollen to form a swollen portion 45B. Shafts 45X for mounting the stand are protruded at both ends of the swollen portion 45B. Kerfs 45C are formed in the stand 45 in parallel in the lengthwise direction thereof at portions on the insides by a predetermined distance from both ends of the swollen portion 45B. Deflection arms 45A are formed by the kerfs 45C on both sides of the stand 45. On the surface of the stand 45 on the side of the lower case, furthermore, there is formed an engaging protrusion 45D for anchoring the stand 45 to the lower case 41L. Reference numeral 45E denotes an inclined surface that is to be hooked by a fingernail at the time when the stand 45 is to be drawn out.

In the lower case 41L is formed a recessed portion 43A for holding the stand, the recessed portion being recessed by the thickness of the stand 45 from the surface of the lower case to hold the stand 45. A deep groove 43C is formed at an end of the recessed portion 43A for holding the stand, in order to hold the swollen portion 45B of the stand 45, and mounting holes 43X are formed on both sides of the deep groove 43C to receive the mounting shafts 45X of the stand 45. The stand 45 can be attached to the lower case 41L by deflecting the deflection arms 45A from the outer sides of the stand 45 toward the sides of the kerfs 45C and by inserting the mounting shafts 45X in the mounting holes 43X.

The stand 45 is moved with a swinging motion toward the outer side of the lower case 41L with the mounting shafts 45X as a center, thereby to stand the portable liquid crystal display device 40 in a tilted manner. In the recessed portion 43A for holding the stand is further formed an engaging hole 41D for locking the engaging protrusion 45D formed on the stand 45.

Figure 12:
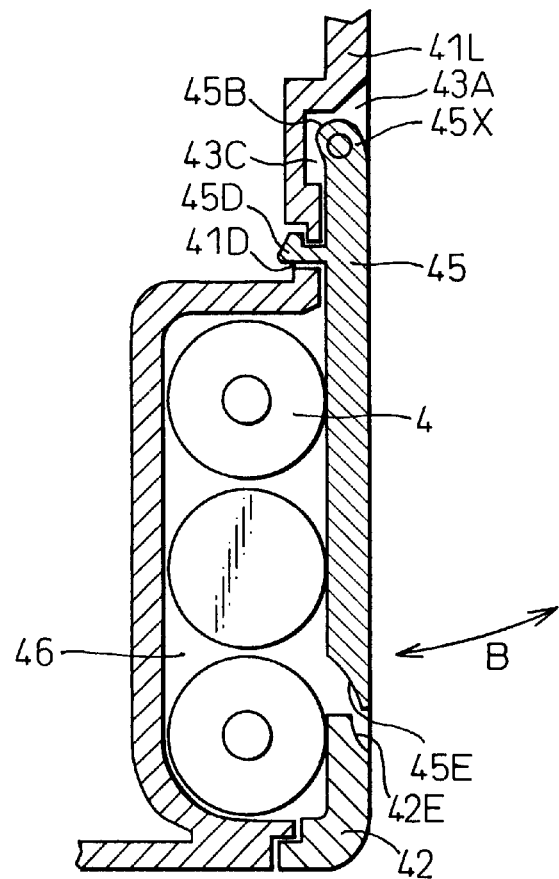
FIG. 12 is a sectional view of a portion along the line Y—Y of the portable liquid crystal display device shown in FIG. 11.

FIG. 12 is a partial sectional view illustrating the vicinity of the battery-holding portion 46 along the line Y—Y in FIG. 11. The mounting shafts 45X of the stand 45 are fitted into the mounting holes in the recessed portion 43A for holding the stand, and the swollen portion 45B of the stand 45 is located in the deep groove 43C. In a state where the stand 45 is closed as shown, the engaging protrusion formed on the stand 45 is locked in the engaging hole 41D formed in the lower case 41L. To swing out the stand 45, therefore, an external force must be applied. AS shown in FIG. 12, furthermore, the inclined surfaces 42E and 45E formed in the battery compartment cover 42 and in the stand 45 of FIG. 11 are opposed to each other in a state where the stand 45 is closed, which is convenient for being hooked by a fingernail of a user when the stand 45 is to be drawn out with a swinging motion.

In this embodiment, the battery compartment cover 42 is of the slide type, and an arrow A in FIG. 11 indicates the direction in which the battery compartment cover 42 slides. The battery compartment cover 42 has a notch 42A for holding the stand 45 at a portion neighboring the recessed portion 43A that holds the stand. The notch 42A has a shape that meets the outer shape of the stand 45, and holds the stand 45 that is closed so will not to protrude outward. Therefore, the battery compartment cover 42 of the slide type and the stand 45 of the swing type share the area of the lower case 41L.

In a state where the stand 45 is closed, the outer surface of the stand 45, the surface of the lower case 41L and the surface of the battery compartment cover 42 are nearly flush with each other. Therefore, the surface of the portable liquid crystal display device 40 is flattened to realize a smooth design, and the thickness of the portable liquid crystal display device 40 can be decreased.

Figure 13:
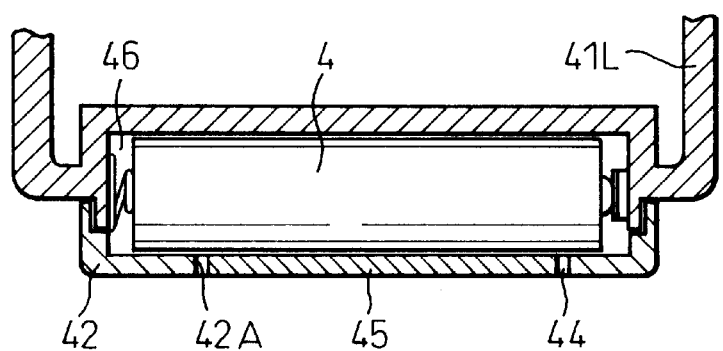
FIG. 13 is a sectional view of a portion along the line X—X of the portable liquid crystal display device shown in FIG. 11.

With the notch 42A being formed in the battery compartment cover 42 as described above, it is possible to confirm that the batterys 4 are held in the lower case 41L from the external side through the notch 42A. Even in a state where the stand 45 is closed and is held in the recessed portion 43A for holding the stand and in the notch 42A, there remains a small gap 44 between the stand 45 and the notch 42A as shown in FIG. 13 which is a sectional view along the line X—X of FIG. 11. Therefore, the batterys 4 in the battery-holding portion 46 can be seen through the gap 44. Thus, the presence of the batterys 4 can be confirmed from the external side without the need of drawing out the stand 45 from the lower case 41L.

Figure 14:
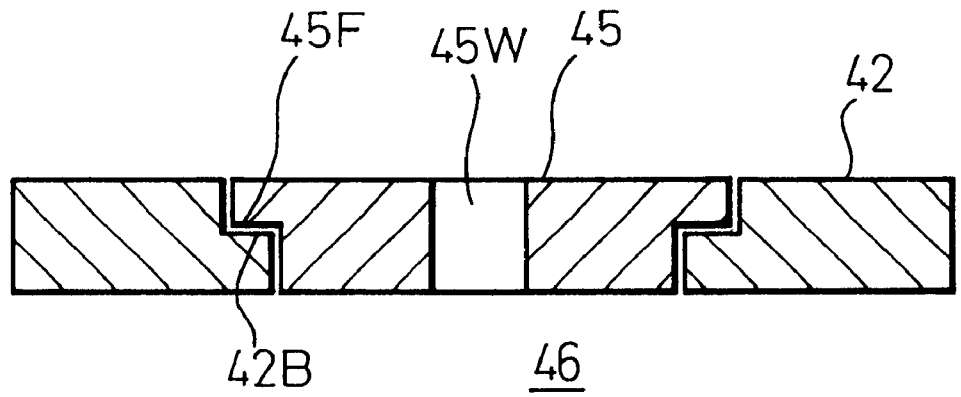
FIG. 14 is a sectional view of a major portion along the line X—X in FIG. 11, and illustrates a modified example of the stand for the portable liquid crystal display device of the first embodiment.

FIG. 14 illustrates a modified example of the stand 45 in the portable liquid crystal display device 40 according to the first embodiment, and shows a major portion in cross section along the line X—X in FIG. 1. In this example, the inner peripheral portion (boundary of opening) of the battery compartment cover 42 is shaped like a step as designated at 42B, and the outer peripheral portion of the stand 45 is shaped like a step of an opposite figure as designated 45F, making it possible to prevent the infiltration of dust and dirt into the battery-holding portion 46 through the gap between the battery compartment cover 42 and the stand 45.

In this case, a window 45W may be formed in the stand 45 above the battery-holding portion 46, so that the presence of the batterys can be confirmed from the external side even in a state where the stand 45 is not drawn out.

Figure 15:
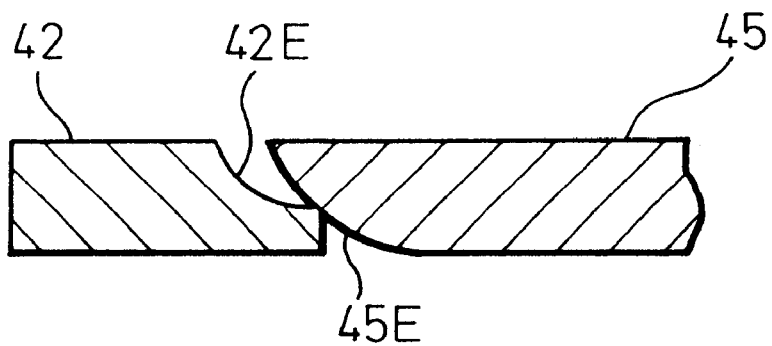
FIG. 15 is a sectional view of a major portion along the line X—X in FIG. 11, and illustrates a modified example of the stand of the portable liquid crystal display device of the first embodiment.

The inclined surface 45E formed at the lower end of the stand 45 and opposed to the above-mentioned inclined surface 42E formed at the lower central portion in the inner periphery of the battery compartment cover 42, may have a shape that is curved outward as shown in FIG. 15 in addition to being curved inward as shown in FIG. 12. In either case, the stand 45 can be easily swung open by being hooked by a fingernail of the user.

FIGS. 16A and 16B are a front view and a back view illustrating a portable liquid crystal display device 50 according to a second embodiment of the present invention.

Though not diagramed, the portable liquid crystal display device 50 contains a drive control circuit, a television receiver circuit and the like circuits in space defined by an upper case 51 of the front surface side and a lower case 61 of the back surface side. The upper case 51 includes a display window 53 through which an image displayed on a liquid crystal display panel 52 contained therein can be seen, a windshield 54 covering the display window 53, an ornamental plate 55 surrounding the windshield 54, holes 56 for emitting sound from a speaker, and buttons 57 for selecting a channel displayed on the liquid crystal display panel 52. The lower case 61 includes a battery compartment cover 62 for replacing the batterys held in the lower case 61, a stand 65 and an antenna 68.

The lower case 61 and the battery compartment cover 62 are so formed that the neighboring portions are of the same height so as to represent the expression of a unitary design. Swollen portions 61A and 62A are formed in the lower case 61 and in a portion of the battery compartment cover 62, and the stand 65 is arranged across the swollen portions 61A and 62A. The stand 65 is attached to the lower case 61 by deflecting the deflection arms 65A on both sides toward the kerfs 65C. In this embodiment, furthermore, the stand 65 has an extended portion 65E at a lower end thereof on the side where the antenna 68 is provided.

The extended portion 65E works to prevent the portable liquid crystal display device 50 from falling sideways. That is, referring to FIG. 16C, when the antenna 68 is extended sideward in a state where the portable liquid crystal display device 50 is stood in a tilted manner by drawing the stand 65 from the lower case 61, the center of gravity of the portable liquid crystal display device 50 is shifted toward the side of the antenna 68. Thus, the extended portion 65E works to prevent the portable liquid crystal display device 50 from falling sideways even though the center of gravity is shifted toward the side of the antenna.

In the swollen portions 61A and 62A are provided recessed portions 61B and 62B for holding the stand 65 when it is closed. In a state where the stand 65 is closed and is held in the recessed portions 61B and 62B for holding the stand, the outer surface of the stand 65 is nearly in flush with the surfaces of the swollen portions 61A and 62A.

The swollen portions 61A and 62A protrude, while being smoothly curved, from the portions located on the inside by a predetermined length from both sides of the lower case 61, and have a height nearly equal to the thickness of the stand 65. Therefore, when the portable liquid crystal display device 50 is gripped by hand of the user in a state where the stand 65 is closed and held in the recessed portions 61B and 62B for holding the stand, the swollen portions 61A and 62A just fit in the palm of the user. Therefore, the user does not feel that the portable liquid crystal display device 50 is thick.

Figure 18A:
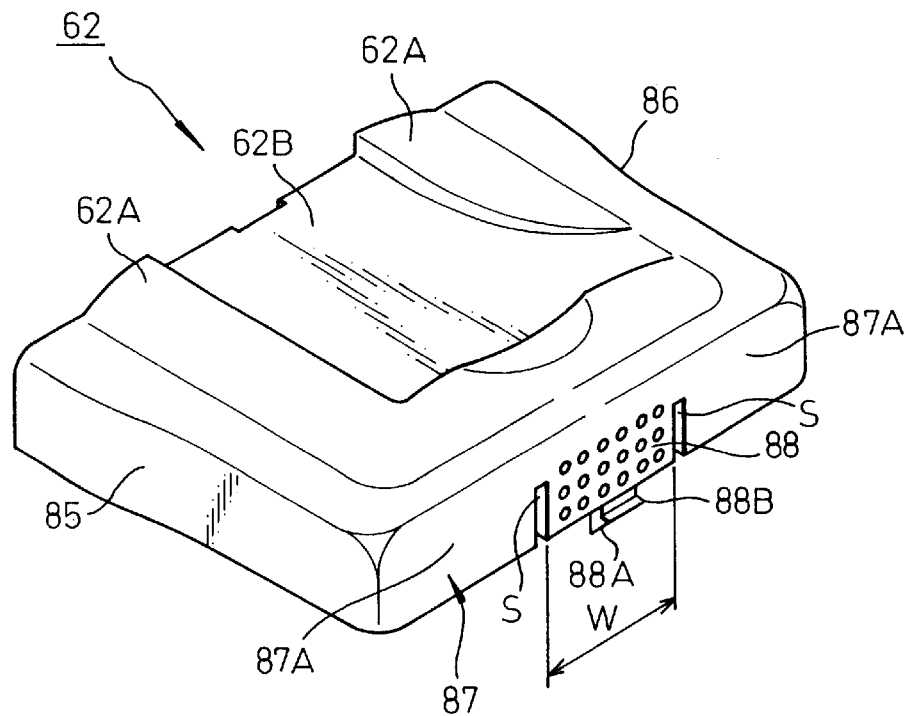
FIG. 18A is a perspective view of when the battery compartment cover shown in FIG. 16B is viewed from the front side.
Figure 18B:
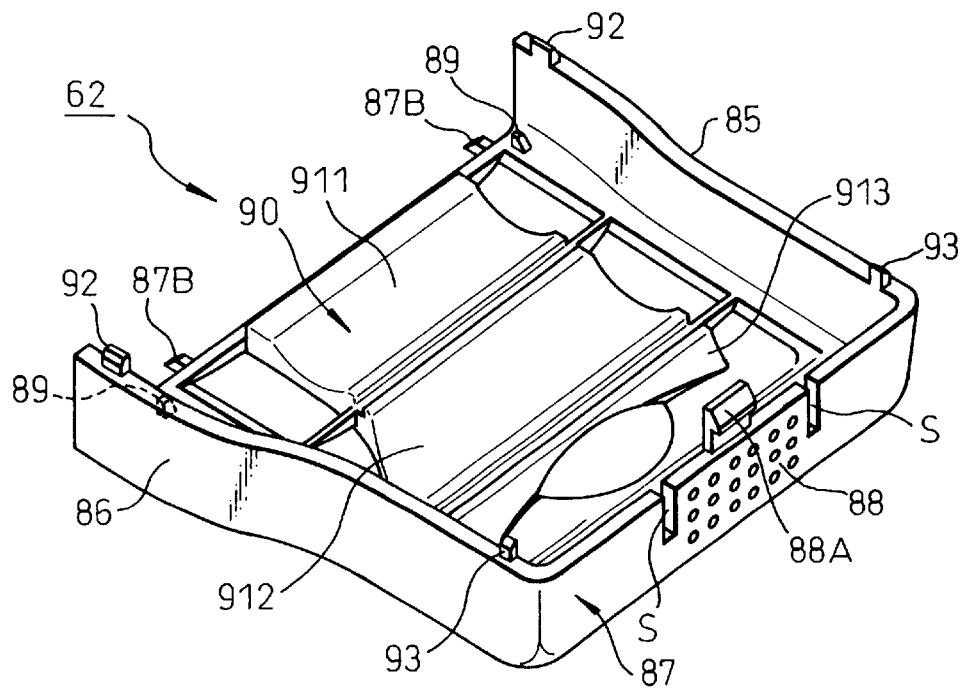
FIG. 18B is a perspective view of when the battery compartment cover shown in FIG. 16B is viewed from the back side.
Figure 19:
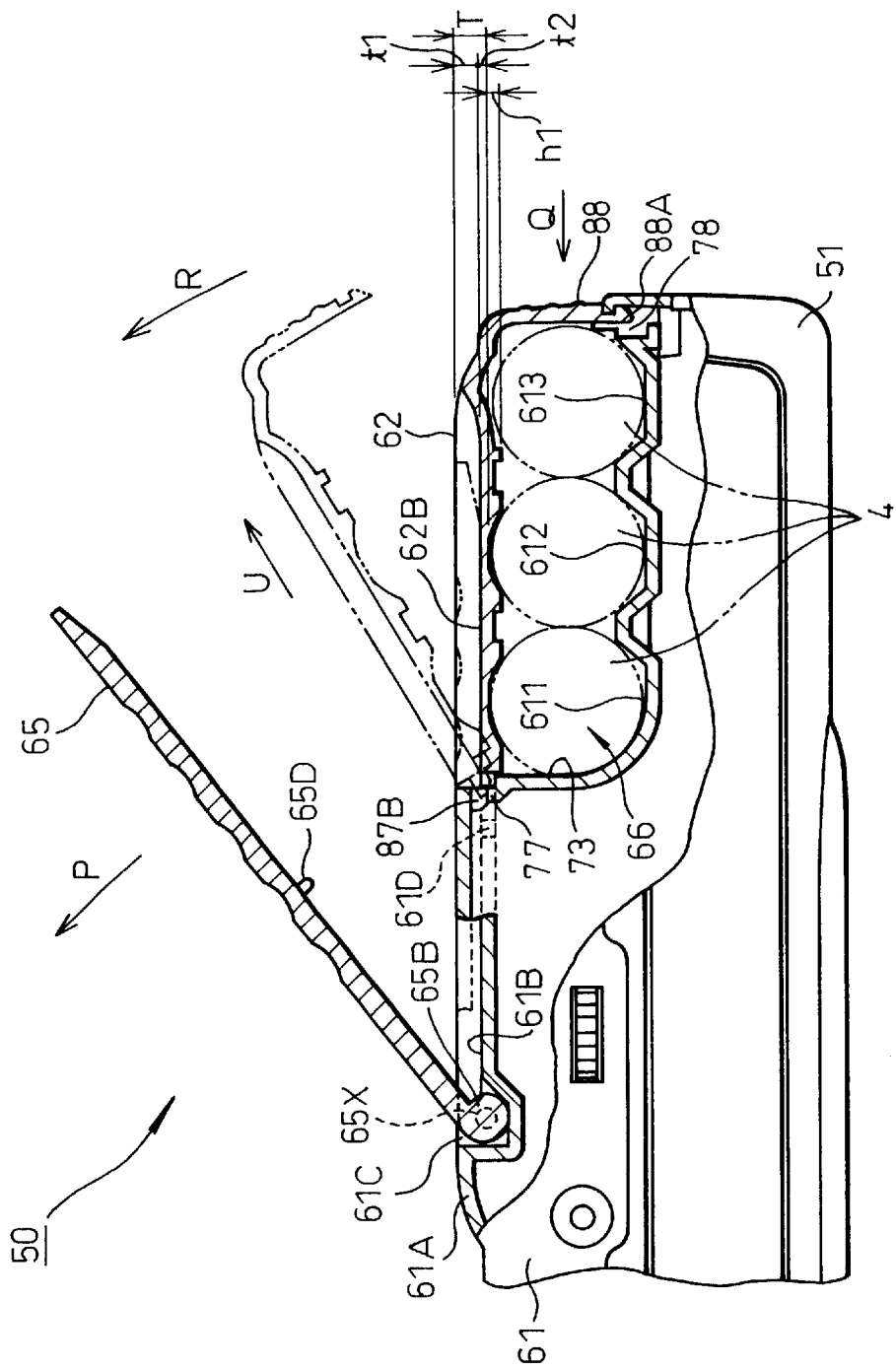
FIG. 19 is a side view of the device including a cross section along the line A—A in FIG. 16B.

Features of the constitution of the portable liquid crystal display device 50 on the back surface side thereof according to a second embodiment will be described below with reference to FIGS. 17 to 21. FIG. 17 illustrates a state where the battery compartment cover 62 is removed from FIG. 16B. FIGS. 18A and 18B, respectively, illustrate the constitution on the front side of the battery compartment cover 62 and the constitution on the back side of the battery compartment cover 62. FIG. 19 illustrates the side surface of the device by cutting away a portion thereof along the line A—A in FIG. 16B, FIG. 20 illustrates the bottom surface of the device by cutting away a portion thereof along the line B—B in FIG. 16B, and FIG. 21 is a bottom view of the device by cutting away a portion thereof along the line C—C in FIG. 16B.

In the second embodiment, the stand 65 is attached to the lower case 61 in the same manner as attaching the stand 45 to the lower case 41L in the first embodiment. That is, referring to FIG. 17, mounting holes 61X are formed in the side walls at both ends of the recessed portion 61B for holding the stand formed in the swollen portion 61A of the lower case 61. Upon deflecting the deflection arms 65A of the stand 65 toward the kerfs 65C, therefore, the mounting shafts 65X protruded on both sides of the deflection arms 65A can be fitted into the mounting holes 61X. As shown in FIG. 19, furthermore, a swollen portion 65B is formed at the portion of the mounting shafts 65X of the stand 65, and a deep groove 61C is formed in the recessed portion 61B for holding the stand to correspond to the swollen portion 65B in the same manner as described above.

Furthermore, an engaging hole 61D is formed in the recessed portion 61B for holding the stand, and an engaging protrusion 65D formed at a position corresponding to the engaging hole 61D in the stand 61 comes into engagement with the engaging hole 61D when the stand 65 is held in the recessed portion 61B, enabling the stand 65 to be held and secured in the recessed portion 61B in the same manner as described above.

Figure 20:
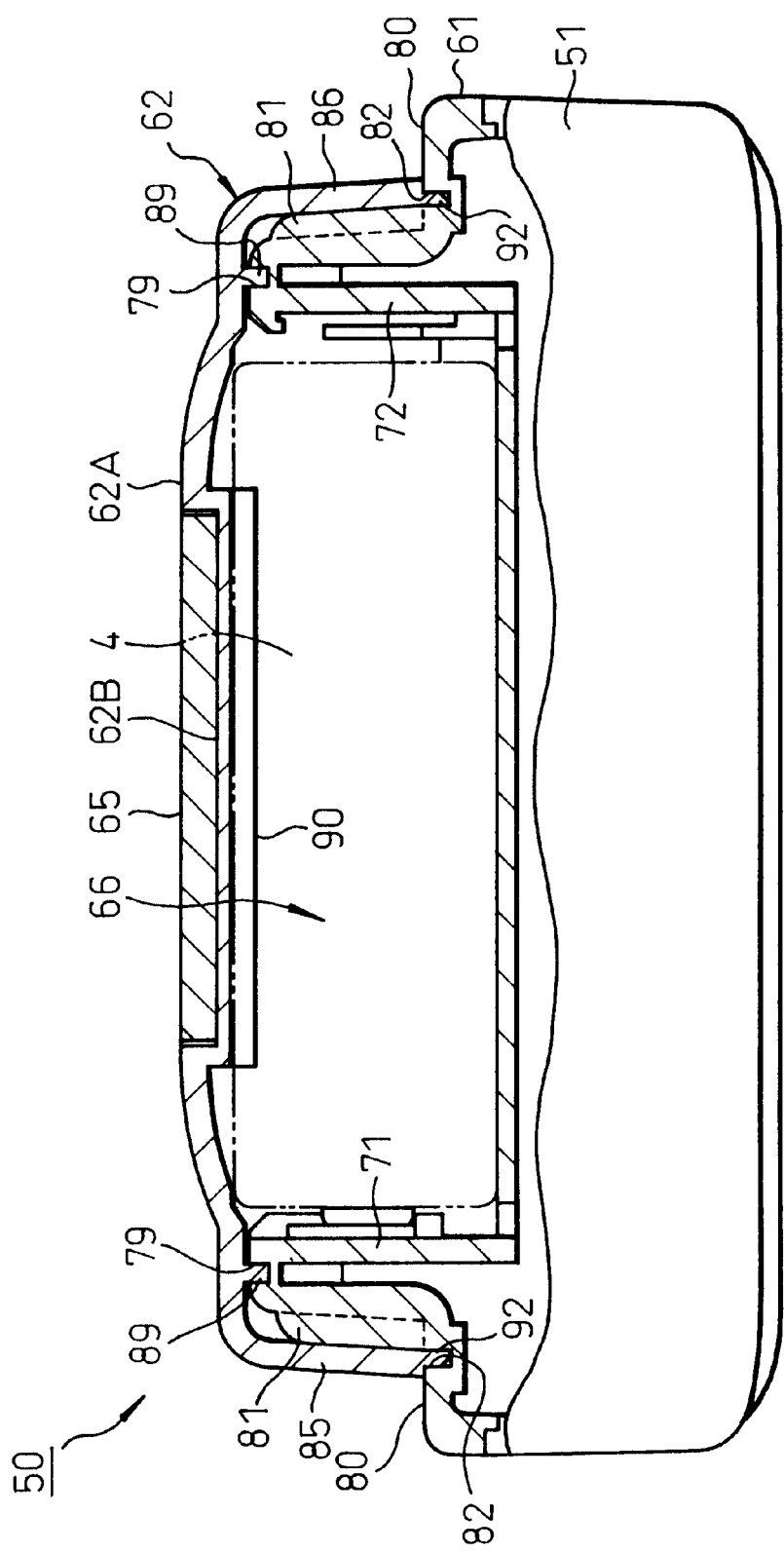
FIG. 20 is a bottom view of the device including a cross section along the line B—B in FIG. 16B.
Figure 21:
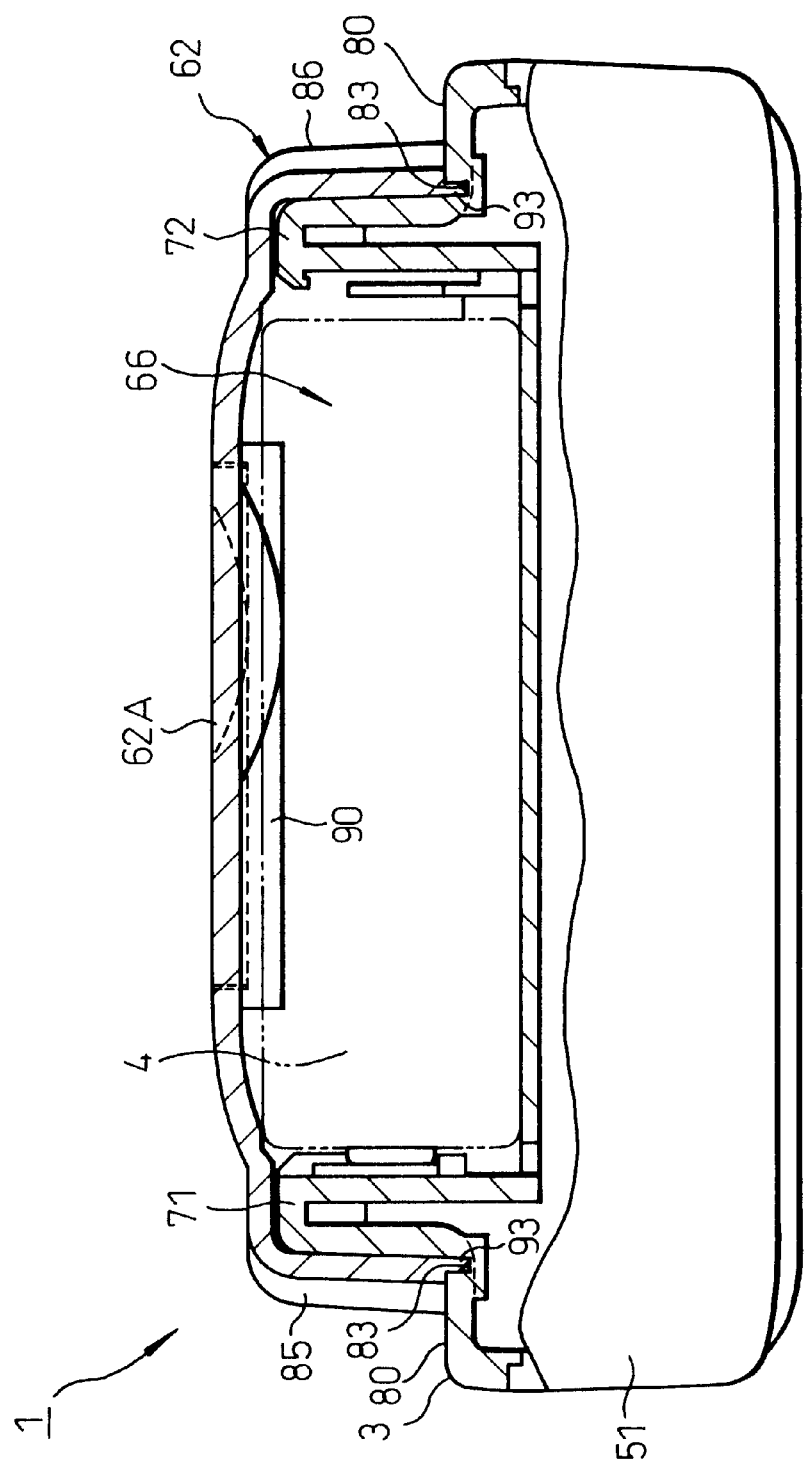
FIG. 21 is a bottom view of the device including a cross section along the line C—C in FIG. 16B.

As shown in FIGS. 17, 20 and 21, furthermore, the battery-holding portion 66 formed in the lower case 61 is surrounded by side walls 71, 72 on both sides thereof, an upper inner wall 73 and a lower stepped portion 74. The battery-holding portion 66 is further formed by bed plates 611, 612 and 613 for holding a plurality of batterys 4. Positive terminals (not shown) and negative terminals (not shown) are alternatingly provided on the walls of the battery-holding portion 66 which forms the inner surfaces of the side walls 71 and 72 so as to be positioned on the bed plates 611, 612 and 613.

An engaging hole 78 for engagement with the battery compartment cover 62 that will be described later is formed in the central portion of a lower stepped portion 74 of the lower case 61, and stop protuberances 84 are erected on both sides of the engaging hole 78 maintaining a predetermined distance. The stop protuberances 84 are low ridges. Furthermore, a pair of engaging holes and a plurality of engaging recessed portions are formed in the lower case 61 for engagement with the battery compartment cover 62.

First, engaging holes 77 are formed on both sides of a parting wall 76 continuous from the front surface of the lower case 61, the engaging holes 77 serving as a support portion when the battery compartment cover 62 is opened and closed, and engaging recessed portions 79 are formed in the upper surface of the side walls 71 and 72 on the outer sides thereof. Engaging recessed portions 82 are formed on the stepped portions 80 of the lower case 61 at both ends of the parting wall 76, and guide poles 81 are provided between the engaging recessed portions 82 and the side walls 71, 72, the guide poles 81 having a circumferential surface rising along the side walls 71, 72 from the stepped portions 80. The ends of the guide poles 81 are spherical, and the engaging recessed portions 82 are located at the outermost circumferential portions of the guide poles 81. Furthermore, engaging recessed portions 83 are formed on the stepped portions 80 neighboring the side walls 71 and 72 on the lower end side of the side walls 71 and 72.

Referring to FIG. 18A, the battery compartment cover 62 has side walls 85, 86 and a lower wall 87, and has, on the surface thereof, a swollen portion 62A expressing a design integral with that of the lower case 61, and a recessed portion 62B for holding the stand formed at the central portion of the swollen portion 62A. Two slits S are formed in the lower wall 87, stop walls 87A are formed on the lower walls on the outer sides of the slits S, and a depressing portion 88 that is molded to have an anti-slipping rough surface is formed on the lower wall 87 sandwiched between the two slits S.

The depressing portion 88 has a width W smaller than the distance W1 between the stop protuberances 84 shown in FIG. 17. This is to prevent the depressing portion 88, when depressed, from interfering with the stop protuberances 84. From the lower end of the depressing portion 88 is protruded an engaging hook 88A having an engaging pawl 88B of which the end is of the shape of a wedge.

As shown in FIG. 18B, furthermore, from the upper end of the battery compartment cover 62 are protruded engaging pieces 87B at positions corresponding to the engaging holes 77 (see FIG. 17) formed in the lower case 61. When the battery compartment cover 62 is to be opened and closed, the engaging pieces 87B are inserted in the engaging holes 77 to determine the position of the battery compartment cover 62 and work as a fulcrum for turning the battery compartment cover 62.

Near the engaging pieces 87B on the back surface of the battery compartment cover 62, furthermore, there are provided engaging pieces 89 that engage with the engaging recessed portions 79 formed in the lower case 61. At the end surfaces of the side walls 85 and 86, there are provided engaging pieces 92 on the side close to the engaging pieces 89, the engaging pieces 92 engaging with the engaging recessed portions 82 formed in the stepped portions 80 of the lower case 61. Engaging pieces 93 are further protruded on a side close to the lower wall 87 to engage with the engaging recessed portions 83 formed in the stepped portions 80 on the lower end side of the lower case 61. The engaging pieces 89, 92 and 93 have ends in the form of a wedge so as to smoothly engage with the engaging recessed protions 79, 82 and 83.

On the inner surface of the battery compartment cover 62 is provided a holding portion 90 for holding the batterys 4 sandwiched by the opposing bed plates 611, 612 and 613 of the battery-holding portion 66 formed in the lower case 61. The holding portion 90 is constituted by the holding surfaces 911, 912 and 913 opposed to the bed plates 611, 612 and 613. The thickness of the battery compartment cover 62 at the central portion except the holding surface 913 is nearly one-half the thickness of other portions. The holding surfaces 911, 912 and 913 are of a shape that comply with the side surfaces of the batterys 4, and the gap portions among the neighboring batterys 4 have an increased thickness to reinforce the battery compartment cover 62. The holding surface 913 has a size smaller than that of other holding surfaces 911 and 912. This is because a portion located on the back side of the holding surface 913 is the swollen portion 62A that has a large thickness and there is no need to reinforce the back side of the battery compartment cover 62.

As shown in FIG. 19, furthermore, the thickness T from the outermost end of the stand 65 to the side surfaces of the batterys 4 includes the thickness t1 of the stand 65 and a thickness t2 of the thin portion of the battery compartment cover 62. The thickness t2 of the battery compartment cover 62 is about one-half the thickness of the battery compartment cover in the conventional device described with reference to FIG. 7. Therefore, the thickness T according to the present invention is much smaller than the thickness T1 from the outermost end of the stand 35 to the side surfaces of the batterys 4 of the prior art described with reference to FIG. 7. The reason is that the thickness t1 of the stand 65 of the present invention is the same as the thickness t1 of the conventional stand 35, the thickness t2 of the battery compartment cover 62 is about one-half the thickness t of the conventional battery compartment cover 32, and the battery compartment cover 62 is opened and closed not in a sliding manner but in a swinging manner as will be described later, making it possible to eliminate the height h of the engaging hook 32A of the battery compartment cover 32 and the gap c required by the conventional device.

The holding portions 911, 912 and 913 exhibit a function for reinforcing the vicinity of the recessed portion 62B of the battery compartment cover 62 in addition to exhibiting the function for holding the batterys 4.

The opening and closure of the battery compartment cover 62 in the thus constituted portable liquid crystal display device 50 will now be described with reference to FIGS. 19 to 21.

To remove the battery compartment cover 62 from the lower case 61, the stand 65 is turned in a direction P shown in FIG. 19 and, then, the depressing portion 88 of the battery compartment cover 62 is depressed by a fingertip from a direction Q. The depressing portion 88 undergoes a resilient deformation toward the battery-holding portion 66. At the same time, the engaging pawl 88B of the engaging hook 88A formed integrally therewith is disengaged from the engaging hole 78 formed in the lower case 61. Then, the lower end of the battery compartment cover 62 is lifted up and is opened in a manner to describe an arc in a direction R; i.e., the battery compartment cover 62 turns with its engaging pieces 87B being rotatably held by the engaging holes 77. At a position indicated by a two-dot chain line, the battery compartment cover 62 is moved in a direction U, whereby the engaging pieces 87B are disengaged from the engaging holes 77 of the lower case 62, and the battery compartment cover 62 is removed from the lower case 61.

The battery compartment cover 62 can be mounted on the lower case 61 according to a reverse procedure which, therefore, is not described here in detail. In mounting the battery compartment cover 62 on the lower case 61, furthermore, the battery compartment cover 62 is moved in a direction opposite to the direction U, and the engaging piece 87B at the front end is inserted in the engaging hole 77 of the lower case 62. Thereafter, the battery compartment cover 62 is turned in the direction opposite to the direction R so as to draw an arc. In a step in which the battery compartment cover 62 turns and moves, the inner walls at the open ends of the side walls 85 and 86 of the battery compartment cover 62 are expanded by the guide poles 81 formed in the lower case 61. Therefore, the inner walls at the open ends of the two side walls 85 and 86 of the battery compartment cover 62 are smoothly guided, the engaging pieces 92 engage with the engaging recessed portions 82, and motions of the open ends of the side walls 85 and 86 are limited.

Thereafter, the engaging pieces 89 protruded on the back surface of the battery compartment cover 62 are engaged with the engaging recessed portions 79 formed in the end surfaces of side walls 71 and 72 of the lower case 61 and the engaging pieces 93 are engaged with the engaging recessed portions 83 formed on the lower end side of the stepped portions 80. Moreover, stop walls 27A engage with the stop protuberances 84 formed on the stepped portions 74 of the lower case 61, whereby the motion of the lower end side of the battery compartment cover 62 is limited, dispersion of stress is prevented owing to the two slits S, and the engaging hook 88A is not broken even if the battery compartment cover 26 is depressed to an excess degree. Moreover, no play develops between the battery compartment cover 62 and the lower case 61 despite of wear in the engaging portions and dispersion of quality at the time of molding.

Figure 22A:
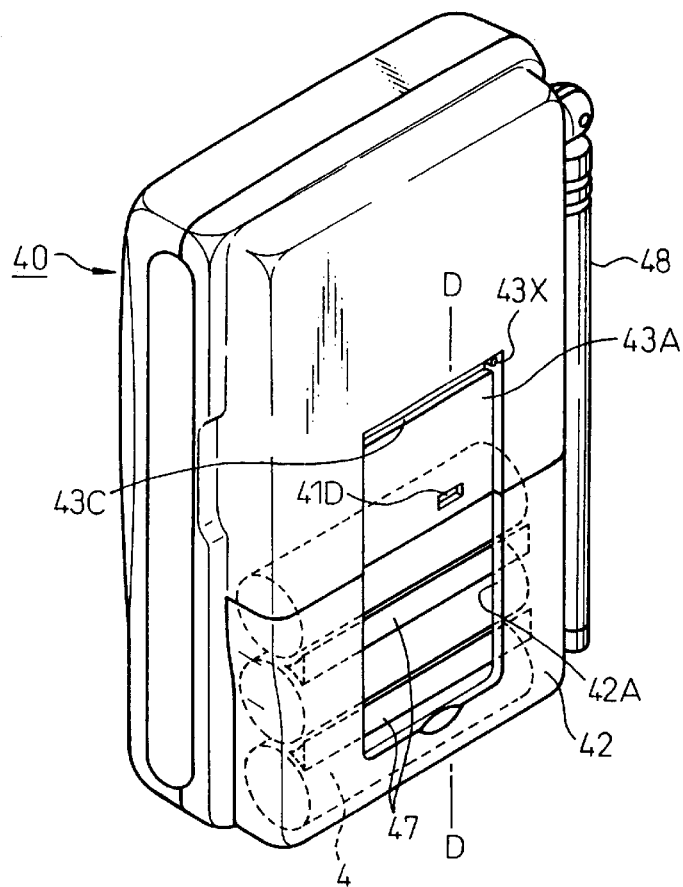
FIG. 22A is a perspective view illustrating a state where the stand is removed from the portable liquid crystal display device of the first embodiment which is equipped with the battery compartment cover of the swing type of the portable liquid crystal display device of the second embodiment.
Figure 22B:
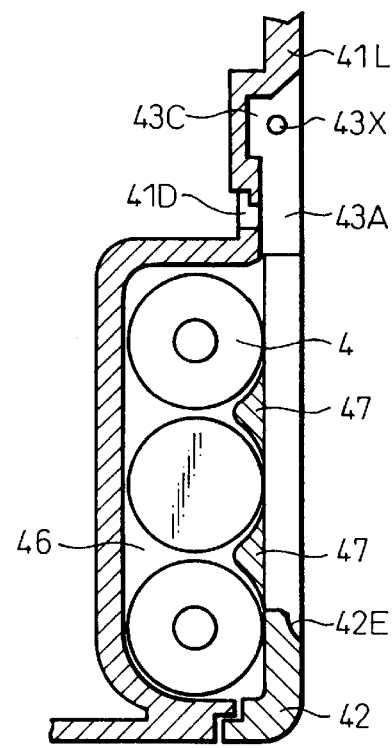
FIG. 22B is a partial sectional view along the line D—D in FIG. 22A.

When the constitution of the swing-type battery compartment cover 65 of the portable liquid crystal display device 50 of the second embodiment is applied to the portable liquid crystal display device 40 of the first embodiment described with reference to FIG. 11, the notch 42A of the battery compartment cover 42 is provided with ribs 47 in a direction in parallel with the batterys 4, as shown in FIGS. 22A and 22B, to reinforce the strength. The positions for providing the ribs 47 are in a space between the neighboring batterys 4 held in the battery-holding portion 46 as shown in FIG. 22B.

Figure 23A:
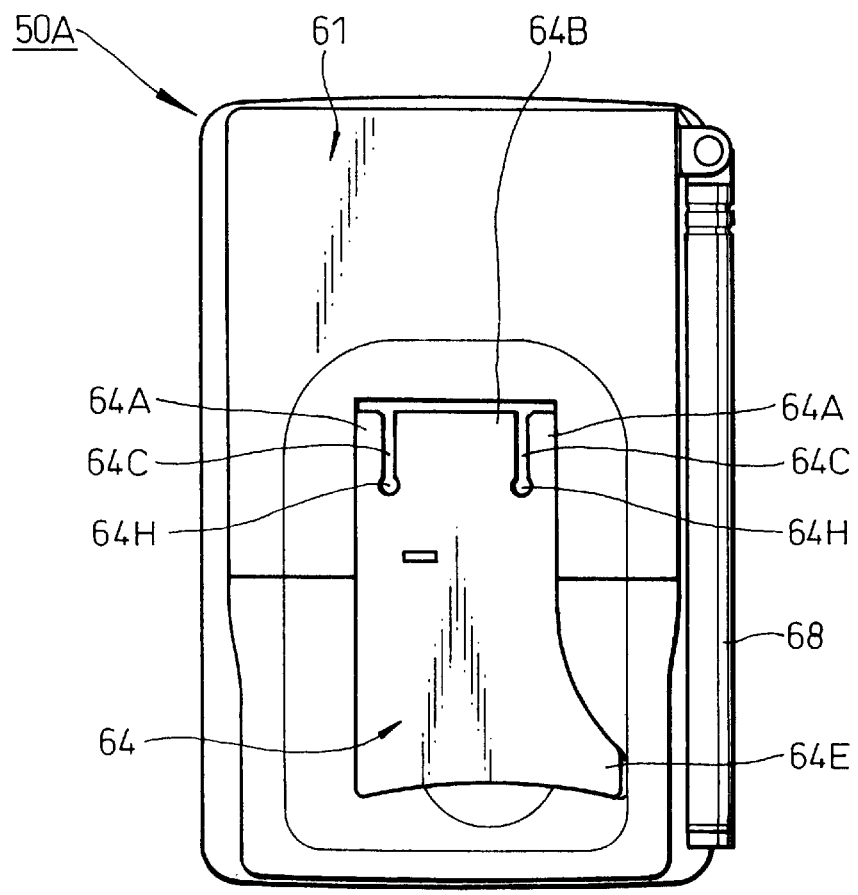
FIG. 23A is a back view of when a modified example of the portable liquid crystal display device according to the second embodiment is viewed from the back surface side.

A portable liquid crystal display device 50A shown in FIG. 23A is a modified example of the portable liquid crystal display device 50 of the second embodiment, and is different from the portable liquid crystal display device 50 of the second embodiment with respect to the shape of the stand 64 only.

Figure 16C:
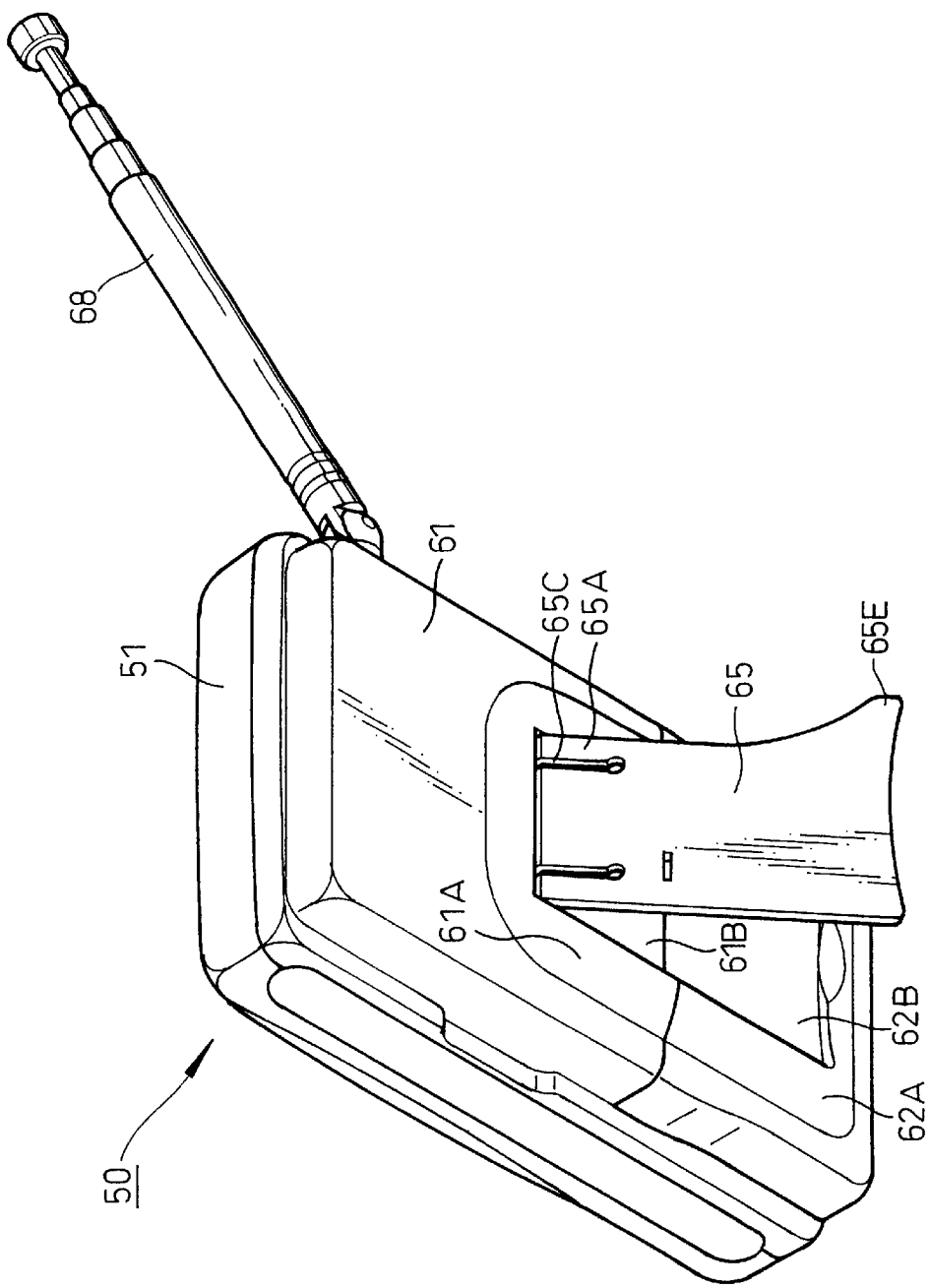
FIG. 16C is a perspective view illustrating a state where the stand of FIG. 16B is drawn out to stand the portable liquid crystal display device and where the antenna is extended.
Figure 17:
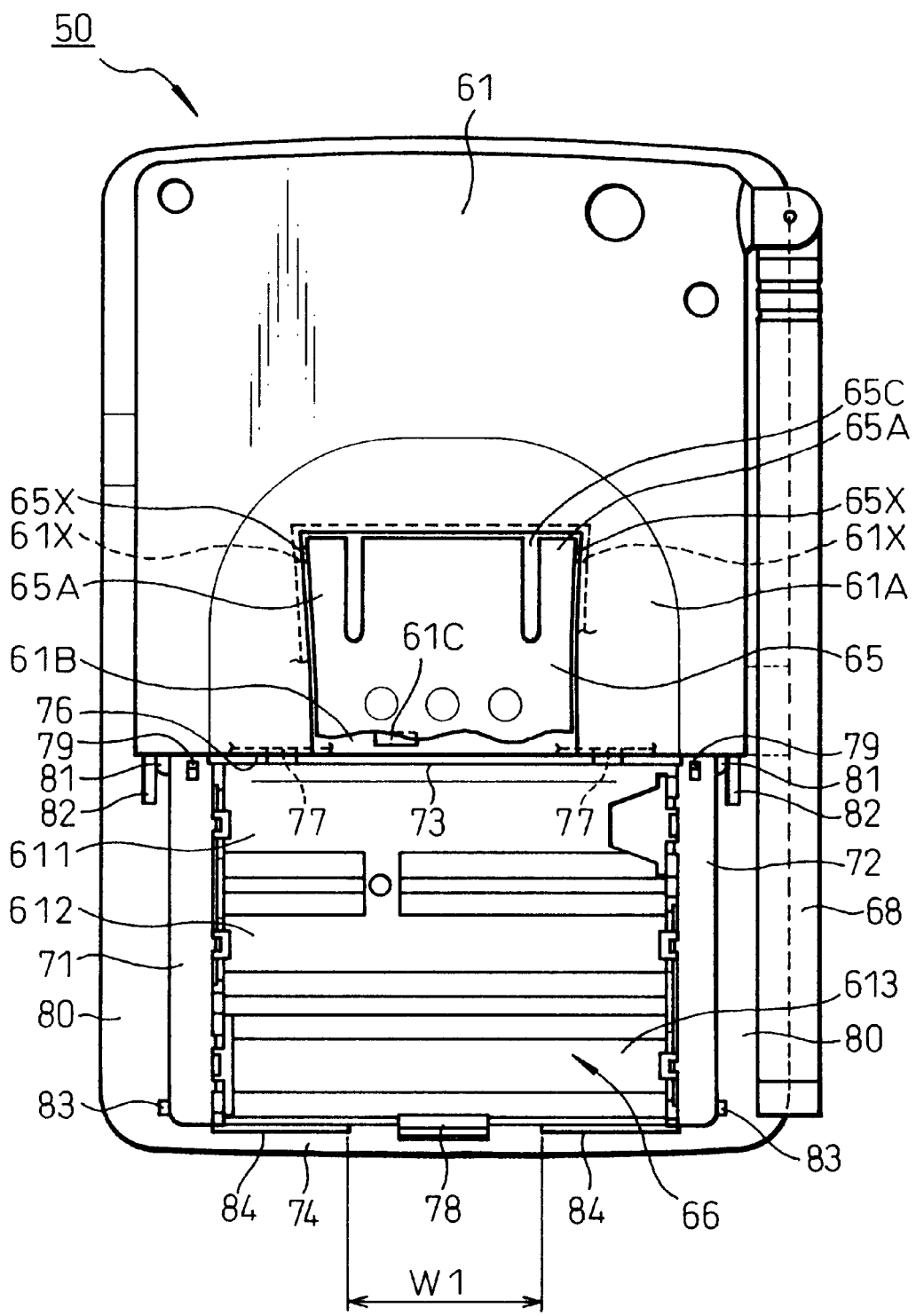
FIG. 17 is a back view illustrating a state where a battery compartment cover is removed from FIG. 16B.

That is, the stand 65 explained with reference to FIGS. 16B, 16C and 17 is provided with two parallel kerfs 65C for deflecting the deflection arms 65A, and the ends of the kerfs 65C are formed in an arcuate shape having a diameter equal to the width of the kerfs. The stand 64 of this modified example has deflection arms 64A, a swollen portion 64B, kerfs 64C, an engaging protrusion (not shown) and mounting shafts 64X at positions the same as those of the stand 65. Here, however, the ends of the kerfs 64C have a shape different from that of the stand 65.

Figure 23B:
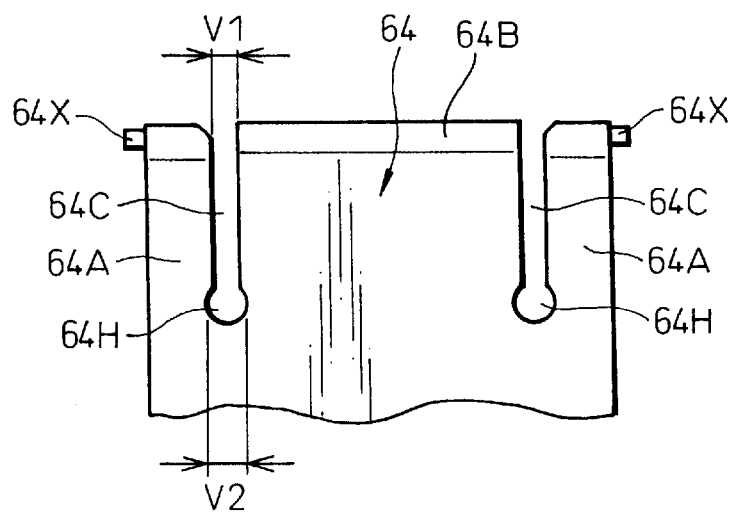
FIG. 23B is a plan view illustrating, on an enlarged scale, the constitution of a portion of the stand of FIG. 23A.

That is, referring to FIG. 23B, a circular groove 64H is formed at the ends of the kerfs 64C of the stand 64, the circular groove 64H having a diameter V2 larger than the width V1 of the kerfs 64C.

The circular groove 64H is formed at the ends of the kerfs 64C of the stand 64 in order to relax the concentration of stress at the ends of the kerfs 64C.

When the stand 64 is abruptly drawn out or when the portable liquid crystal display device 50A accidentally falls with the stand 64 being drawn out from the lower case 61, the deflection arms 64A deform toward the kerfs 64C. Here, with the circular grooves 64H being formed at the ends of the kerfs 64C, however, concentration of stress at the ends of the kerfs 64C is relaxed. As a result, almost no cracks develop at the ends of the kerfs 64C, and the stand 64 is removed from the lower case 61.

Figure 24:
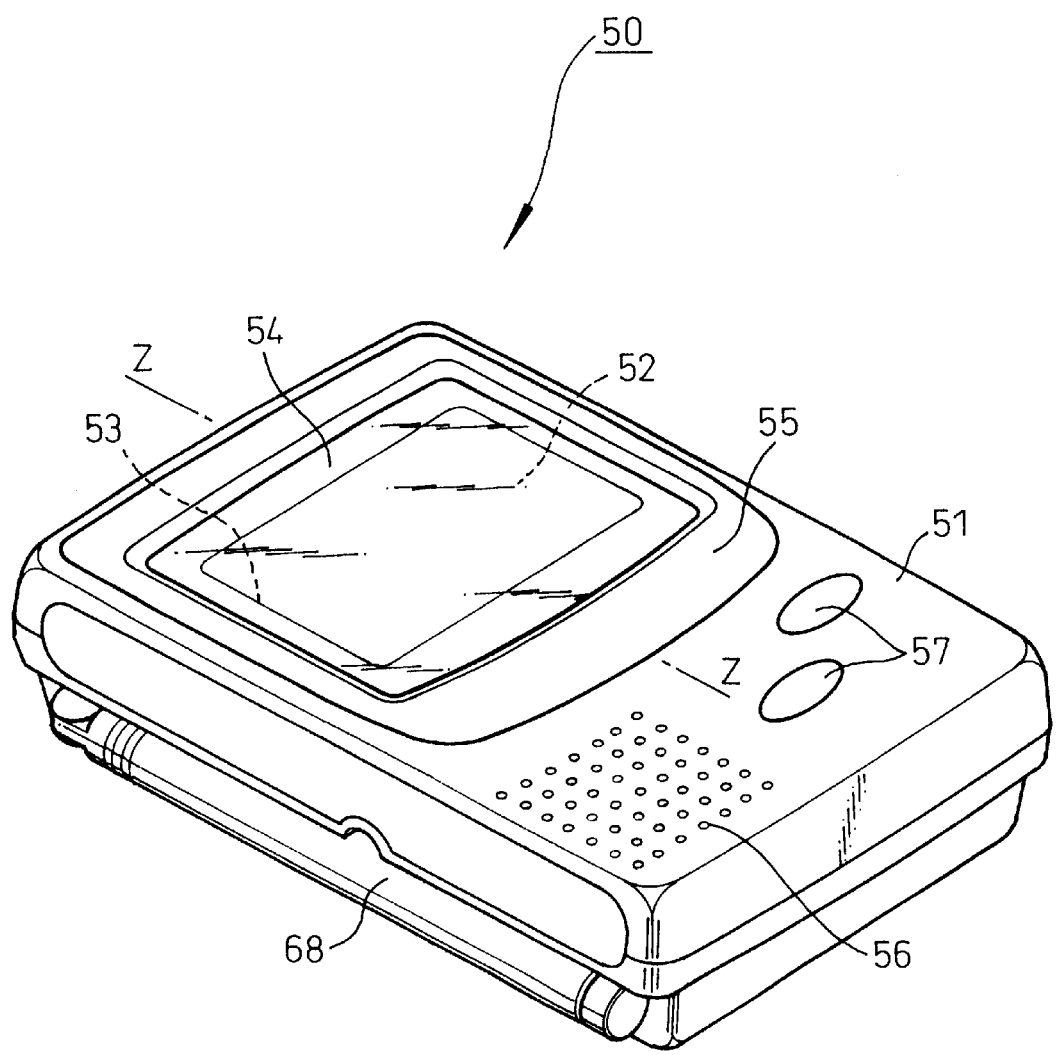
FIG. 24 is a perspective view of the portable liquid crystal display device shown in FIG. 16A.

Next, described below is the constitution of the front surface side (upper case 51 side) of the portable liquid crystal display device 50 according to the second embodiment of the present invention. FIG. 24 is a perspective view of the portable liquid crystal display device 50 shown in FIG. 16A. The upper case 51 includes a display window 53 for viewing image displayed on the liquid crystal display panel 52 contained therein, a windshield 54 for covering the display window 53, an ornamental plate 55 surrounding the windshield 54, holes 56 for emitting sound of a speaker, and buttons 57 for selecting a channel displayed on the liquid crystal display panel 52. Reference numeral 68 denotes an antenna.

Figure 25:
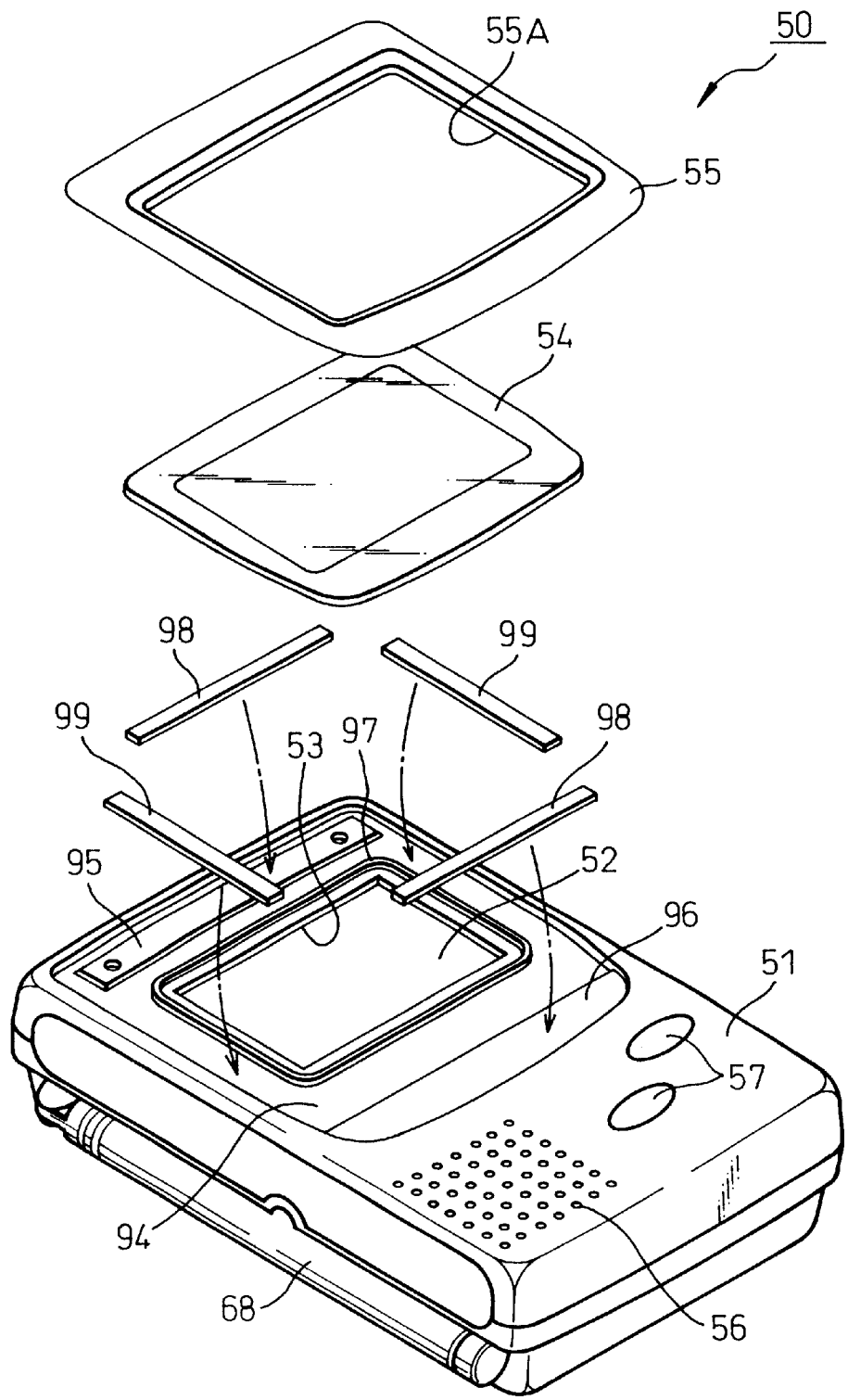
FIG. 25 is a perspective view of an assembly of before the windshield and the ornamental plate of FIG. 24 are mounted on the upper case.

FIG. 25 illustrates a state of before the windshield 54 and the ornamental plate 55 of FIG. 24 are mounted on the upper case 51. In this state, the liquid crystal display panel 52 is exposed through the display window 53 formed in the upper case 51.

The periphery of the display window 53 formed in the upper case 51 forms a recessed portion 94 of the case being lowered by a predetermined height from the surface of the upper case 51 that has holes 56 for emitting the sound from the speaker. Bed plates 95 and 96 for placing the ornamental plate 55 are provided on the upper side and the lower side of the display window 53 in the recessed portion 94 of the case. The height of the bed plates 95 and 96 from the recessed portion 94 of the case is smaller than the height from the recessed portion 94 of the case to the surface of the upper case 51. In this embodiment, furthermore, the bed plate 95 is in the form of a rectangular island, and the bed plate 96 is in the form of a step along the lower end of the recessed portion 94 of the case.

Furthermore, a rib-like protuberance 97 which is slightly higher than the recessed portion 94 of the case is provided on the recessed portion 94 of the case to surround the display window 53. The rib-like protuberance 97 is closed like a loop and has no open portion. The rib-like protuberance 97 has a uniform height from the recessed portion 94 of the case and is intimately adhered to the back surface of the windshield 54 placed thereon.

For the thus constituted recessed portion 94 of the case in this embodiment, a double-sided adhesive tape 98 which is a rectangular double-sided adhesive sheet is stuck onto the bed plates 95 and 96, and a double-sided adhesive tape 99 which is a rectangular double-sided adhesive sheet is stuck onto the recessed portion 94 of the case on both sides of the rib-like protuberance 97, the two sides being in parallel in the lengthwise direction of the upper case 51.

The plate-like windshield 54 made of a transparent glass or resin is mounted on the recessed portion 94 of the case 94 by using the double-sided adhesive tape 99. In this state, the rib-like protuberance 97 is intimately adhered to the back surface of the windshield 54. Furthermore, the ornamental plate 55 made of a resin of an attractive color is mounted on the bed plates 95 and 96 via the double-sided adhesive tape 98. The ornamental plate 55 has the window 55A of a size nearly the same as the size of the windshield 54. Therefore, the windshield 54 is fitted in the window 55A in a state where the ornamental plate 55 is mounted on the bed plates 95 and 96. Thus, the windshield 54 and the ornamental plate 55 are mounted on the upper case 51 in the state shown in FIG. 24.

Figure 26:
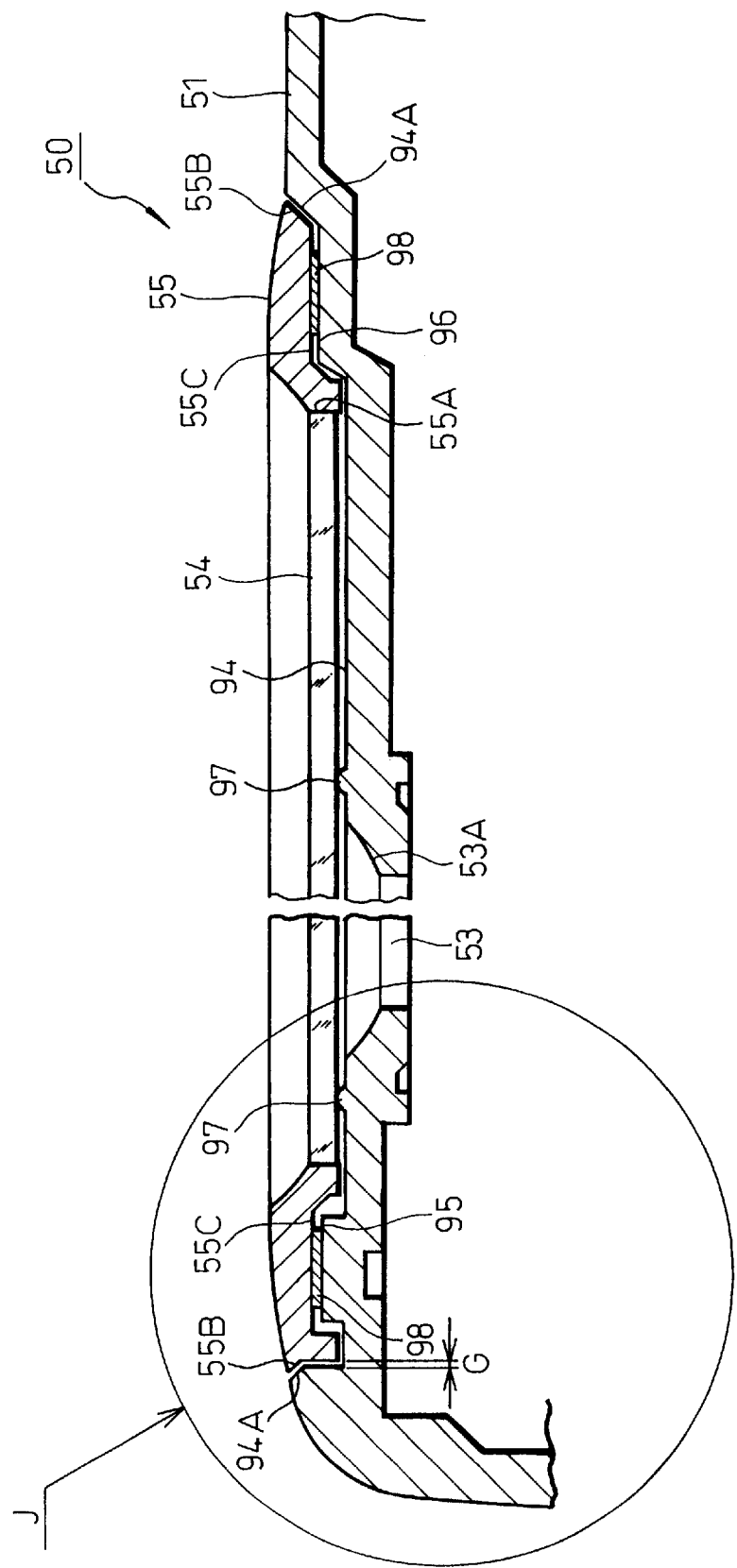
FIG. 26 is a local sectional view illustrating an upper portion of the upper case along the line Z—Z in FIG. 24.

FIG. 26 is a local sectional view illustrating an upper portion of the upper case 51 along the line Z—Z in FIG. 24, and wherein the display window 53 is drawn having a contracted length in the lengthwise direction of the portable liquid crystal display device 50.

As described earlier, the upper case 51 includes the liquid crystal display panel, circuit components and the like, which, however, are not shown here. The display window 53 is formed in front of the liquid crystal display panel so that the image displayed on the liquid crystal display panel can be viewed. The edges of the display window 53 form inclined surfaces 53A headed toward the center of the display window 53 so that the display on the liquid crystal display panel becomes vivid. A portion of the upper case 51 where the display window 53 is formed is recessed as designated at 94 to become lower than the upper surface of the upper case 51. The edges of the recessed portion 94 of the case also form inclined surfaces 94A.

The rib-like protuberance 97 formed on the recessed portion 94 of the case surrounding the display window 53, in this embodiment, has a nearly circular shape in cross section with its width being about 0.5 mm and the height being about 0.08 mm from the recessed portion 94 of the case. The bed plates 95 and 96 for placing the ornamental plate 55 are provided on the upper end side and on the lower end side of the recessed portion 94 of the case. The height of the bed plates 95 and 96 from the recessed portion 94 of the case is larger than the height of the rib-like protuberance 97. The double-sided adhesive tape 98 is stuck onto the bed plates 95 and 96.

The windshield 54 made of a transparent resin or glass and having characters or pictures printed on the inner outer peripheral portions thereof, is supported and secured on the recessed portion 94 of the case by the double-sided adhesive tape of a rectangular shape (not shown). The double-sided adhesive tape may be an adhesive agent or a melt-adhering agent. Here, the back surface of the windshield 54, supported and secured by the recessed portion 94 of the case, is press-contacted to the rib-like protuberance 97 that annularly protrudes surrounding the display window 53. In this embodiment, the rib-like protuberance 97 has a semicircular shape in cross section. The rib-like protuberance 97 prevents dust and dirt from entering into the display window 53.

The front surface of the ornamental plate 55 mounted to surround the windshield 54 is curved so as to slightly swell toward the outer side from the outer surface of the case 51. In order to impart an accent to the portable liquid crystal display device 50, furthermore, the ornamental plate 55 is usually formed by molding a material having a color tone and touch feeling different from the case 51, e.g., by molding an ABS or an ABS blended with a metal powder. The material of the ornamental plate 55 is not limited thereto only but may be other resins or metals.

A window 55A for receiving the windshield 54 is formed along the inner periphery of the ornamental plate 55, and an inclined surface 55B is formed on the back surface thereof along the outer periphery to correspond to the inclined surface 94A that is formed along the edge of the recessed portion 94 of the case. Flat surfaces 55C are formed on the back surface of the ornamental plate 55 to face the bed plates 95 and 96 formed in the recessed portion 94 of the case. The ornamental plate 55 is mounted on the upper case 51 in a manner that the flat surfaces 55C are adhered and secured to the bed plates 95 and 96 via a double-sided adhesive tape 98. In this state, the inclined surface 55B of the ornamental plate 55 is opposed and is intimately adhered to the inclined surface 94A along the outer periphery of the recessed portion 94 of the case, or is opposed thereto maintaining a small gap.

The angle of inclination of the inclined surface 55B formed on the back surface of the ornamental plate 55 needs not necessarily be in agreement with the angle of inclination of the inclined surface 94A formed along the outer periphery of the recessed portion 94 of the case.

Figure 27:
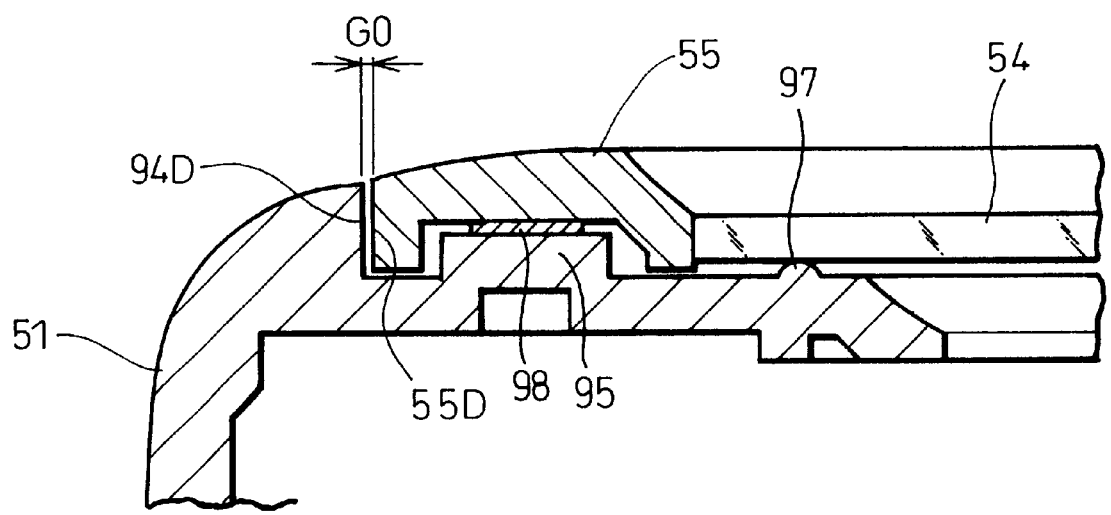
FIG. 27 is a partial sectional view of a portion J in FIG. 26 of when a portion where the ornamental plate is connected to the recessed portion of the case of the present invention is constituted relying upon a prior art.

As described above, the back surface of the ornamental plate 55 is inclined along the outer periphery as designated at 55B and is opposed to the inclined surface 94A along the outer edge of the recessed portion 94 of the case in order to suppress the appearance of a gap G along the boundary between the ornamental plate 55 and the upper case 51. That is, referring to FIG. 27, which shows a portion J of FIG. 26 on an enlarged scale, when the outer periphery of the ornamental plate 55 forms a vertical wall 55D and when the outer edge of the recessed portion 94 of the case forms a vertical wall 94D, the bottom surface of the recessed portion 94 of the case is seen through a gap GO that is inevitably formed between the vertical wall 55D and the vertical wall 94D. According to the present invention, however, the gap G forming along the boundary between the ornamental plate 55 and the upper case 51 can be concealed by the inclined surfaces 55B and 94A.

Figure 28A:
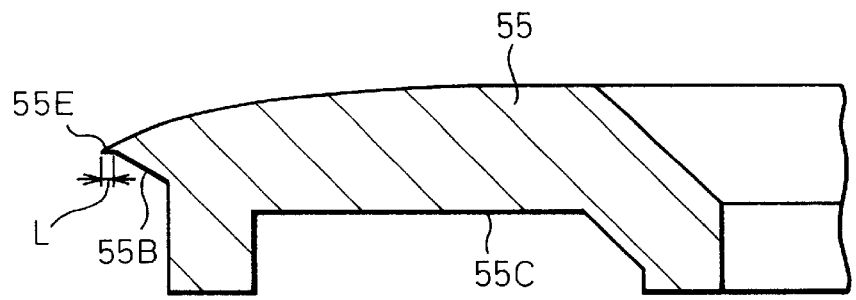
FIG. 28A is a local sectional view illustrating, on an enlarged scale, the constitution of a modified example of the ornamental plate according to the second embodiment of the present invention.
Figure 28B:
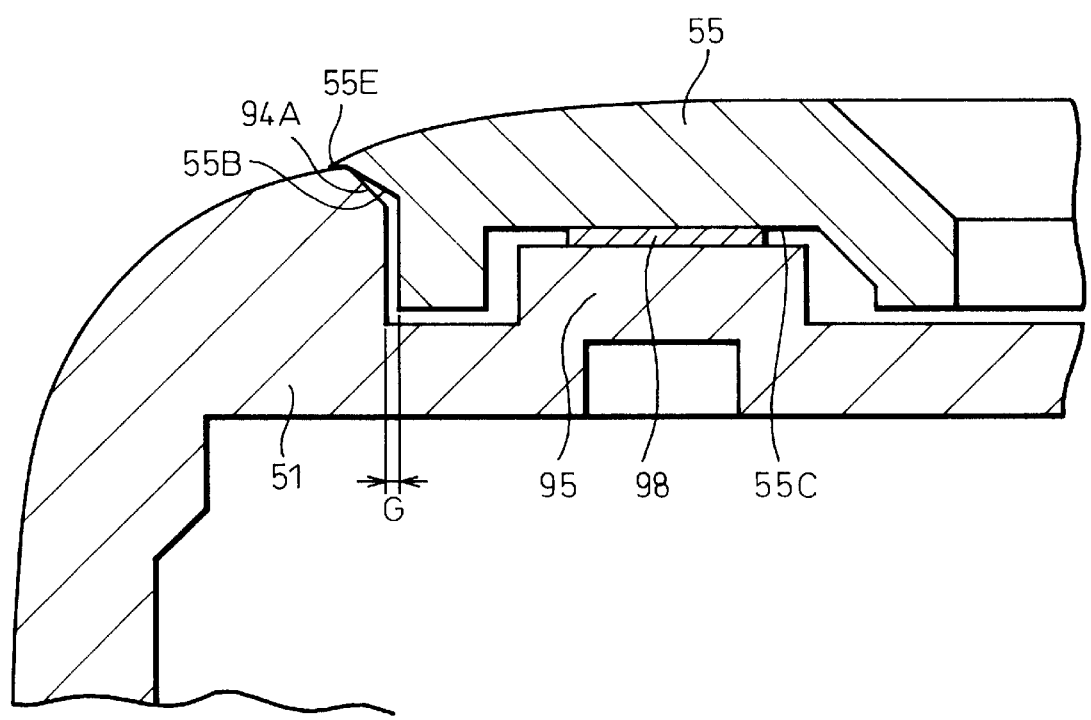
FIG. 28B is a local sectional view illustrating, on an enlarged scale, a state where the ornamental plate of FIG. 28A is mounted on the upper case.

Referring to FIG. 28A, the angle of inclination of the inclined surface 55B formed on the back surface of the ornamental plate 55 along the outer periphery thereof may be relaxed and, besides, a visor portion 55E slightly extending by a distance L may be formed along the edge of the inclined surface 55B. When the ornamental plate 55 shown in FIG. 28A is mounted on the upper case 51 in the same manner as in FIG. 26, the visor portion 55E is placed on the surface of the upper case 51 as shown in FIG. 28B and the gap G formed along the boundary between the ornamental plate 55 and the upper case 51 is not quite seen from the external side. Besides, the boundary becomes smooth between the ornamental plate 55 and the upper case 51.

The ornamental plate 55 constituted as described above can be applied even to the portable liquid crystal display device in which the upper case 51 is not provided with the windshield 54.

Figure 29:
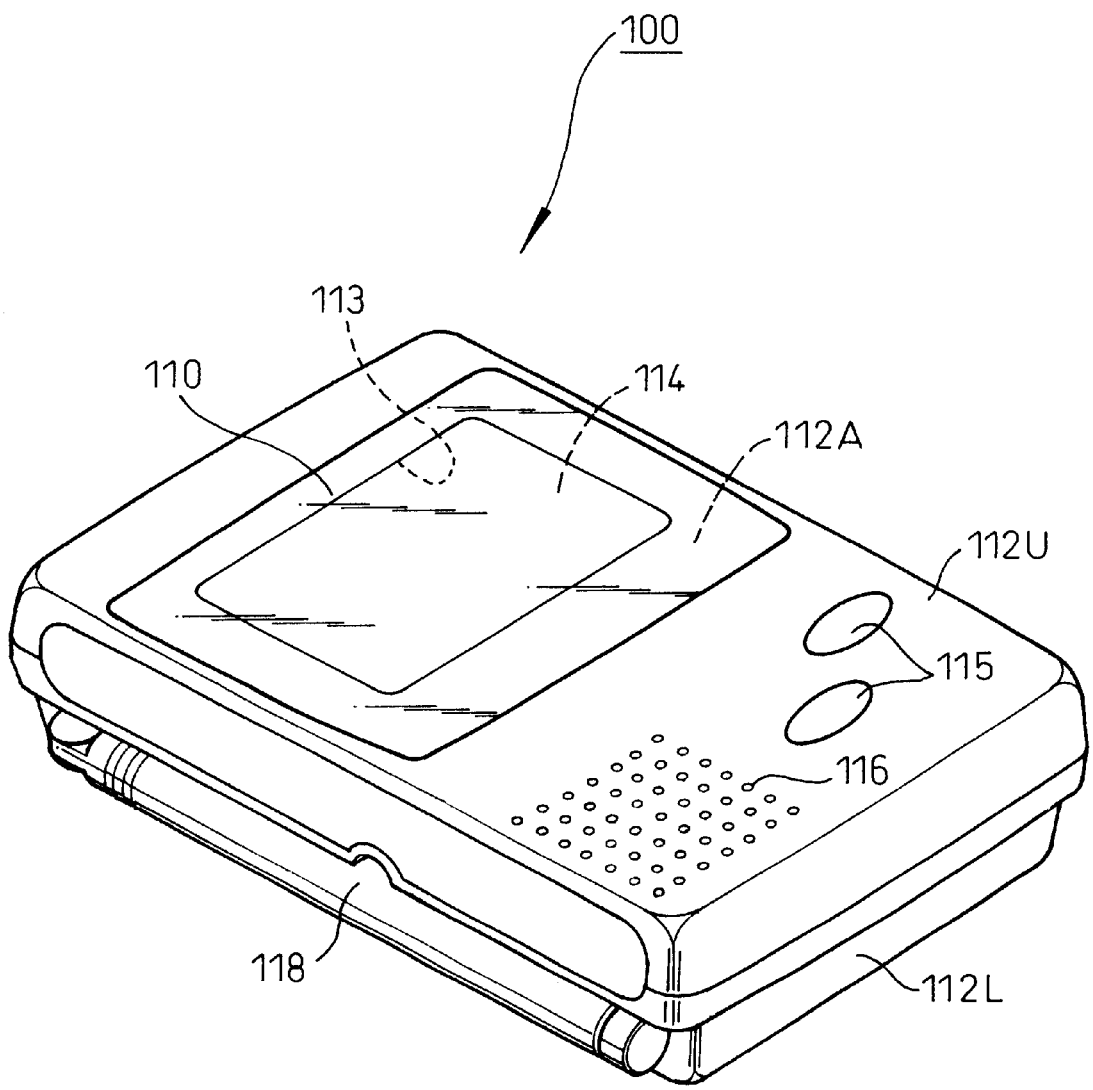
FIG. 29 is a perspective view illustrating the front side of the portable liquid crystal display device according to a third embodiment of the present invention.

FIG. 29 shows the portable liquid crystal display device 100 according to a third embodiment of the present invention as viewed from the front side, i.e., as viewed from the side on which a liquid crystal display window 113 is formed. On the front surface side of the portable liquid crystal display device 100, there is formed in the upper case 112U a display window 113 for viewing an image displayed on the liquid crystal display panel 114 that is contained therein.

Furthermore, a windshield 110 made of a transparent glass or resin is mounted on the front surface side of the display window 113 to protect the liquid crystal display panel 114. The windshield 110 is held in the recessed portion 112A of the case formed to surround the display window 113, and the upper surface of the windshield 110 is nearly flush with the surface of the upper case 112U. Reference numeral 115 denotes buttons for selecting a channel, 116 denotes holes for emitting the sound from the speaker, and 118 denotes an antenna provided on the side surface of the lower case 112L.

Figure 30:
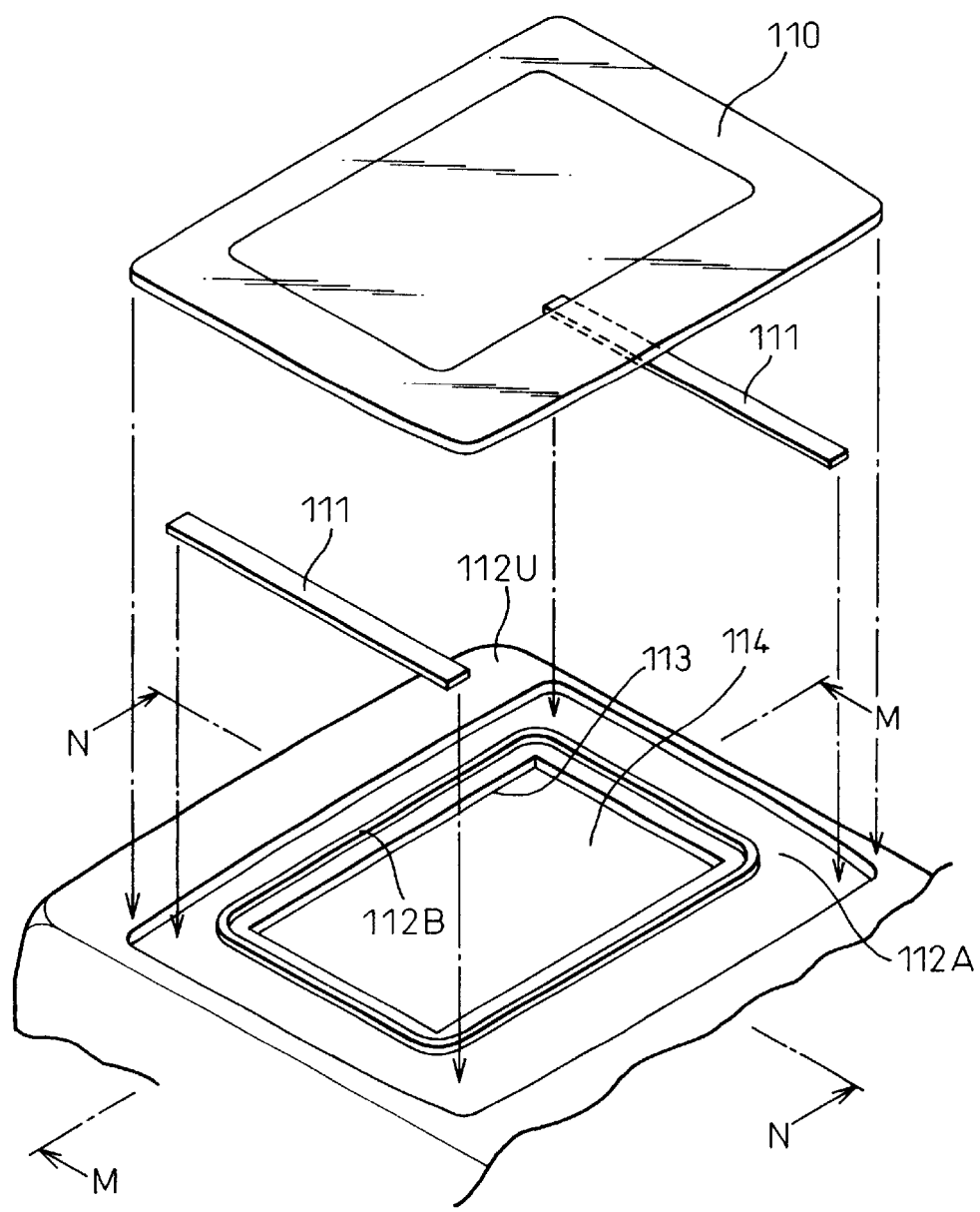
FIG. 30 is a perspective view of an assembly of a major portion in a state where the windshield is removed from the portable liquid crystal display device of FIG. 29.

FIG. 30 illustrates a state of prior to mounting the windshield 110 of FIG. 29 on the upper case 112U. In this state, the liquid crystal display panel 114 is exposed through the display window 113 formed in the upper case 112U.

The periphery of the display window 113 formed in the upper case 112U is lowered by a predetermined height from the surface of the upper case 112U to form a recessed portion 112A of the case. In the recessed portion 112A of the case surrounding the display window 113, furthermore, there is provided a rib-like protuberance 112B that is slightly higher than the recessed portion 112A of the case. The rib-like protuberance 112B is closed like a loop and has no open portion. The rib-like protruded portion 112A has a uniform height from the recessed portion 112A of the case and comes into intimate contact with the back surface of the windshield 110 that is placed thereon.

A double-sided adhesive tape 111 which is a double-sided adhesive sheet of a rectangular shape is stuck onto the recessed portion 112A of the case on both sides of the rib-like protuberance 112B in parallel in the lengthwise direction of the upper case 112U.

The plate-like windshield 110 made of a transparent glass or resin is mounted on the recessed portion 112A of the case due to the double-sided adhesive tape 111. In this state, the rib-like protuberance 112B is intimately adhered to the back surface of the windshield 110. Thus, the windshield 110 is mounted on the upper case 112U assuming a state as shown in FIG. 29.

Figure 31A:
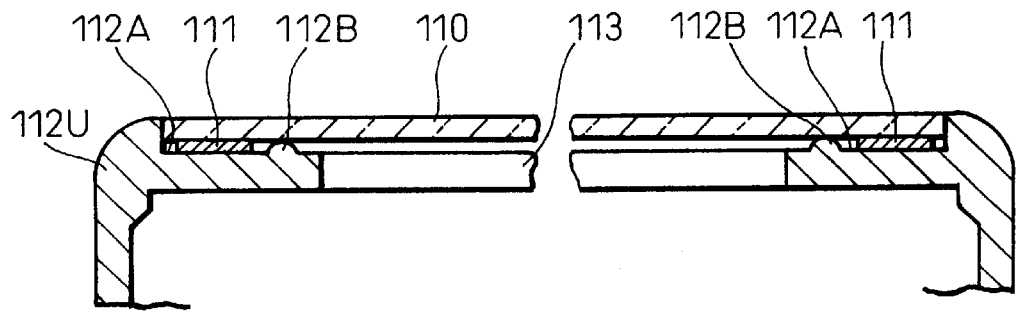
FIG. 31A is a local sectional view of a major portion along the line M—M in FIG. 30.
Figure 31B:
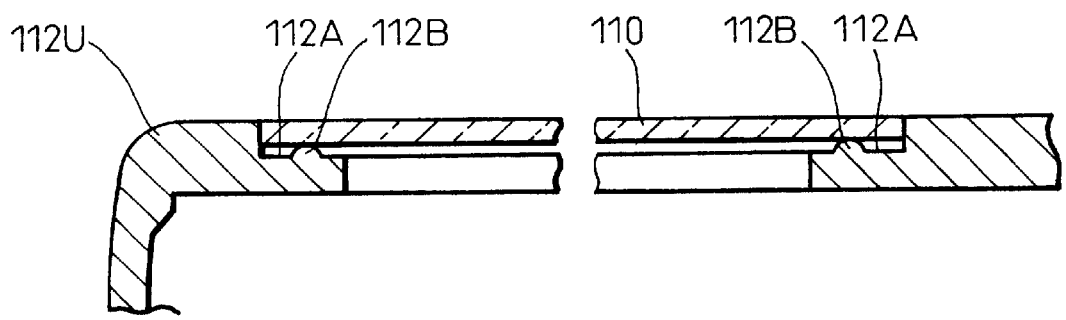
FIG. 31B is a local sectional view of a major portion along the line N—N in FIG. 30.

FIG. 31A is a local sectional view of an upper portion of the upper case 112U along the line M—M in FIG. 30, and FIG. 31B is a local sectional view of an upper portion of the upper case 112U along the line N—N in FIG. 30. The display window 113 of the portable liquid crystal display device 100 has been drawn in a contracted manner.

As described earlier, the upper case 112U contains the liquid crystal display panel and circuit components which, however, are not diagramed here. The display window 113 for viewing the image displayed on the liquid crystal display panel is formed in the front part of the liquid crystal display panel. The portion of the upper case 112U where the display window 113 is provided is forming the recessed portion 112A of the case lower than the upper surface of the upper case 112U.

In this embodiment, the rib-like protuberance 112B formed on the recessed portion 112A of the case surrounding the display window 113 has nearly a circular shape in cross section, the width thereof being about 0.5 mm and the height thereof being about 0.08 mm from the recessed portion 112A of the case.

The windshield 110 made of a transparent resin or glass and having characters or pictures printed on the inner circumferential surface thereof, is secured by the recessed portion 112A of the case due to the double-sided adhesive tape 111 formed in a rectangular shape. The double-sided adhesive tape 111 may use an adhesive or a melt-adhering agent such as dichloroethane or the like alone or in combination. In this case, the back surface of the windshield 110 secured to the recessed portion 112A of the case is press-adhered to the rib-like protuberance 112B that annularly protrudes to surround the display window 113. Due to the rib-like protuberance 112B, dust and dirt are prevented from entering into the display window 113.

Figure 31C:
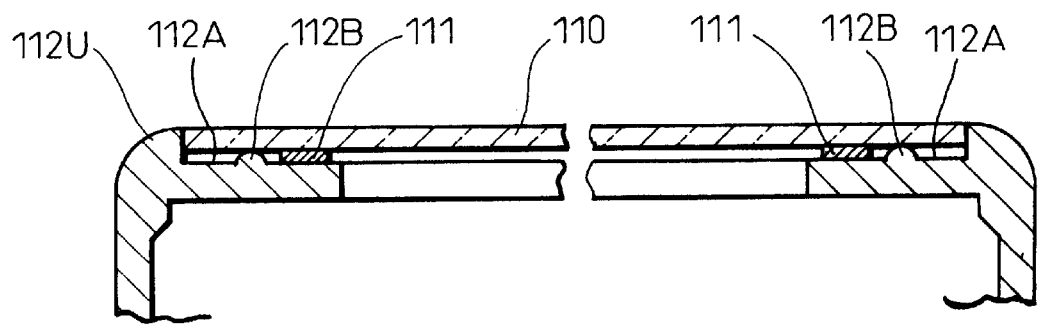
FIG. 31C is a local sectional view of a major portion along the line M—M in FIG. 30, and illustrates the constitution of a modified example where the position for forming a rib-like protuberance is changed according to the third embodiment.

FIG. 31C illustrates the constitution according to a modified example of the third embodiment of the present invention, and is a sectional view of the same portion as that of FIG. 31A. This modified example is different from the embodiment of FIG. 31A only with respect to the position for disposing the double-sided adhesive tape 111 and the rib-like protuberance 112B. That is, in the embodiment described with reference to FIG. 31A, the double-sided adhesive tape 111 is stuck to the outer sides of the rib-like protuberance 112B. In the modified example shown in FIG. 31C, however, the double-sided adhesive tape 111 is stuck to the inner sides of the riblike protuberance 112B. Thus, the double-sided adhesive tape 111 may be stuck at positions on the inside of the rib-like protuberance 112B.

Figure 32A:
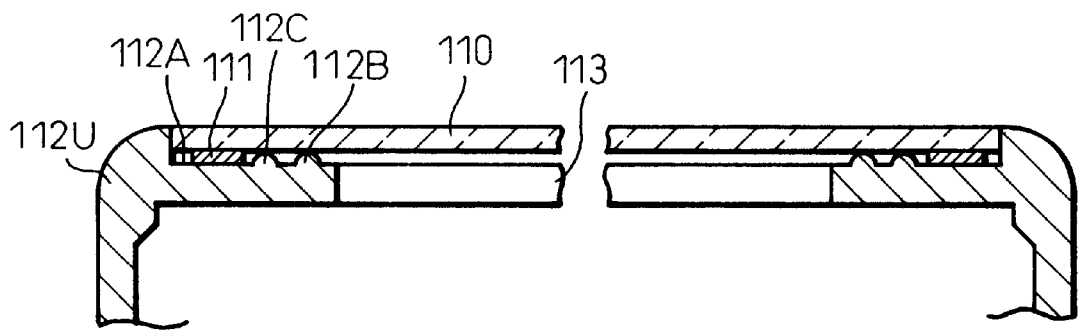
FIG. 32A is a local sectional view of a major portion along the line M—M in FIG. 30, and illustrates the constitution of a first modified example where two rows of rib-like protuberances are formed according to the third embodiment.
Figure 32B:
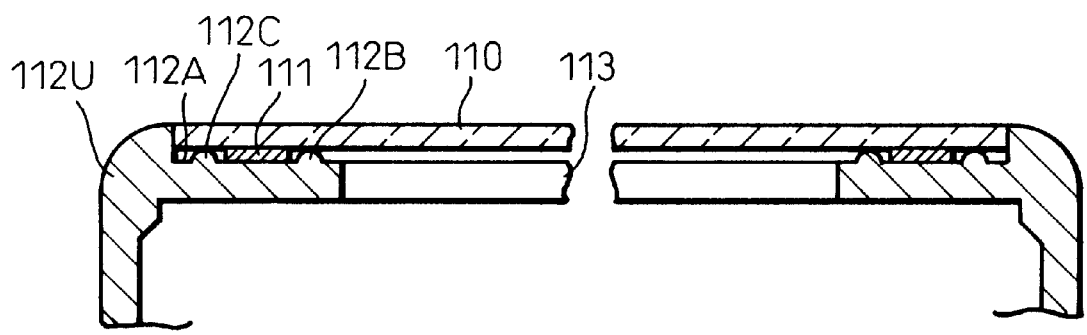
FIG. 32B is a local sectional view of a major portion along the line M—M in FIG. 30, and illustrates the constitution of a second modified example where two rows of rib-like protuberances are formed according to the third embodiment.
Figure 32C:
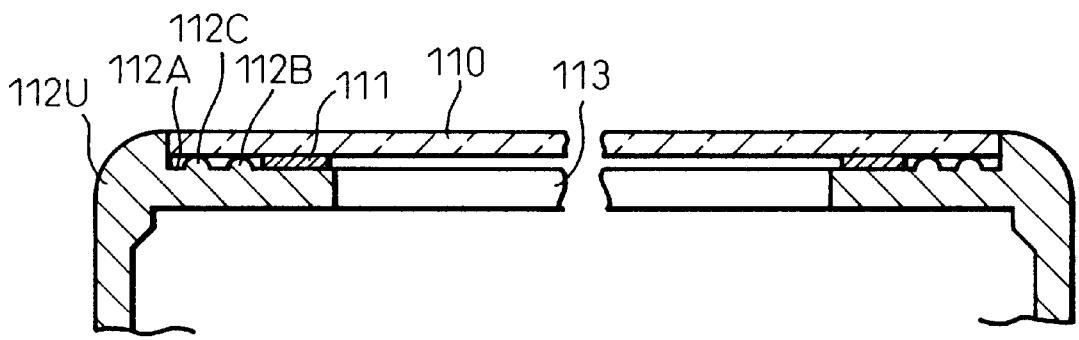
FIG. 32C is a local sectional view of a major portion along the line M—M in FIG. 30, and illustrates the constitution of a third modified example where two rows of rib-like protuberances are formed according to the third embodiment.

FIGS. 32A to 32C illustrate three kinds of constitutions in which the rib-like protuberances are provided in two rows on the recessed portion 112A of the case according to modified examples of the third embodiment of the present invention, and are sectional views of the same portion as that of FIG. 31A.

FIG. 32A corresponds to FIG. 31A and illustrates a modified example in which a rib-like protuberance 112C is arranged on the outer side of the rib-like protuberance 112B of FIG. 31A at a predetermined distance. FIG. 32C corresponds to FIG. 31C and illustrates a modified example in which the rib-like protuberance 112C is arranged on the outer side of the rib-like protuberance 112B of FIG. 31C maintaining a predetermined distance. According to a modified example shown in FIG. 32B, on the other hand, the rib-like protuberance 112C is arranged on the outer side of the recessed portion 112A of the case on where the double-sided adhesive tape 111 is stuck in the embodiment of FIG. 31A.

By providing the rib-like protuberances 112B and 112C in two rows as described above, the dust and dirt are less likely to enter into the display window 113.

According to the modified example of FIG. 32B, furthermore, the double-sided adhesive tape 111 can be stuck at correct positions.

Figure 33A:
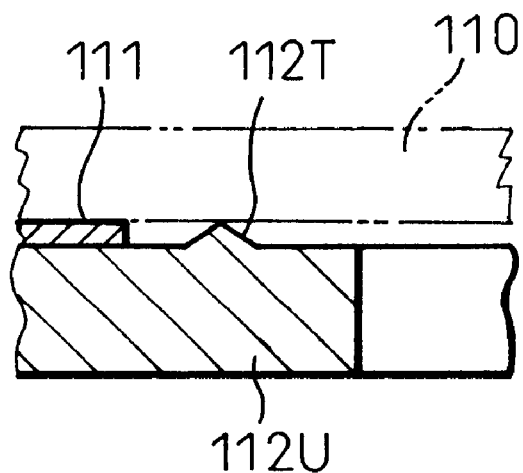
FIG. 33A is a local sectional view illustrating a first modified example of the sectional shape of the rib-like like protuberance according to the third embodiment.
Figure 33B:
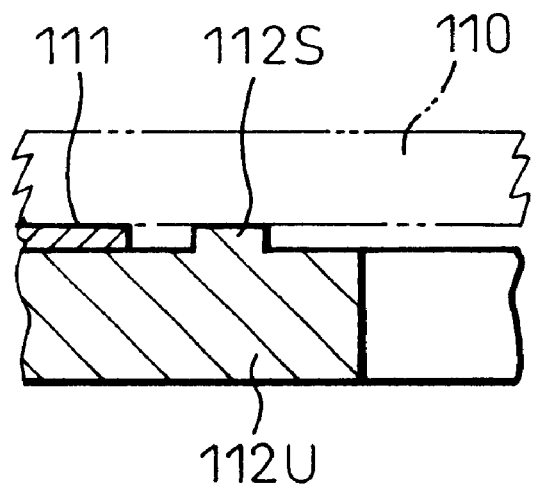
FIG. 33B is a local sectional view illustrating a second modified example of the sectional shape of the rib-like protuberance according to the third embodiment.

Depending upon the size of the portable liquid crystal display device 100 determined by a design, material of the case and strength for supporting the windshield 110, furthermore, the sectional shapes of the rib-like protuberances 112B and 112C are in no way limited to nearly the circular shape that was mentioned above. FIGS. 33A and 33B illustrate other sectional shapes of the rib-like protuberances 112B and 112C, i.e., FIG. 33A shows a rib-like protuberance 112T having a triangular shape in cross section and FIG. 33B shows a rib-like protuberance 112S having a square shape in cross section. The rib-like protuberances 112B and 112C may have polygonal shapes in cross section in addition to the above-mentioned shapes. Even though the rib-like protuberances 112B and 112C have different shapes in cross section, the invention exhibits the same effect as when the rib-like protuberances 112B and 112C have a nearly circular shape in cross section as described above.

Industrial Applicability

According to the constitution of the portable liquid crystal display device of the present invention, the following advantages are obtained.

(1) The battery compartment cover of the slide type and the stand of the swing type share the area of the body of the device. Besides, the surface of the battery compartment cover is nearly flush with the surface of the stand which is in its closed state, enabling the portable liquid crystal display device to be more easily carried.

(2) Since a notch is formed in the battery compartment cover, the presence of batterys in the battery-holding portion can be confirmed from the outside even in a state where the stand and the battery compartment cover are closed.

(3) The manner of opening and closing the battery compartment cover is changed from the slide type into the swing type, and engaging portions are arranged at major portions without decreasing the strength of the battery compartment cover. This makes it possible to decrease the thickness of the battery compartment cover and to eliminate undesired space between the battery compartment cover and the batterys. Accordingly, the thickness of the portable liquid crystal display device is decreased and its portability is enhanced.

(4) Accompanying a change of the battery compartment cover into the one of the swing type, guide protrusions of the battery compartment cover are provided on the walls of the case on both sides of the battery-holding portion, and position-determining holes and protrusions are formed on the case side and on the battery compartment cover side. This makes it possible to smoothly open and close the battery compartment cover and to prevent the occurrence of play between the battery compartment cover and the case irrespective or wear or dispersion in the quality during the molding, contributing to enhancing the strength and quality.

(5) The bottoms of kerfs of the stand of the portable liquid crystal display device are formed in a nearly circular shape to relax the concentration of stress. Therefore, despite the stand is quickly drawn out or the liquid crystal display device accidentally falling with its stand drawn out, no cracks develop in the vicinities of the deflection arms which, therefore, are not broken.

(6) A rib-like protuberance is continuously formed along the display window in the recessed portion that is lower than the case for the purpose of mounting the windshield on the portable liquid crystal display device, and the windshield is stuck onto the recessed portion of the case using a minimum amount of adhesive agent. Therefore, dust and dirt are prevented from entering into the display window, and the cost of the adhesive agent can be decreased.

By forming the rib-like protuberances in two rows and introducing the adhesive agent between the protuberances, it is possible to correctly position the adhesive agent and to prevent a deterioration in the appearance caused by the adhesive agent that bulges out.

(7) An ornamental plate made of a material different from the case of the portable liquid crystal display device and is capable of emphasizing the color tone and touch feeling, is mounted surrounding the windshield in a manner that no gap is formed relative to the case. Therefore, the portable liquid crystal display device exhibits an improved appearance.

What is claimed is:

1. A portable liquid crystal display device powered by batteries, comprising:
   a case having, on a back surface side thereof, a battery-holding portion which is a recessed portion for holding the batteries.
   a battery compartment cover for opening and closing an opening for replacing the batteries in said battery-holding portion;
   a stand of a swing type supported by mounting shafts allowing the stand to swing relative to said case and to move between a state where it is opened by a predetermined angle with a swinging motion from a back surface of said case and a state where it is closed onto the back surface side of said case;
   mounting holes provided in portions of said case to support said stand in a swinging manner; and
   a notch formed in a portion of said battery compartment cover so as to be closed when said stand is closed;
   wherein a recessed portion for holding the stand is formed in said case, so that an outer surface of said stand becomes nearly flush with the back surface of said case in a state where said stand is closed;
   the notch in said battery compartment cover is continuous to said recessed portion for holding the stand, so that a front surface of said stand is nearly flush with a front surface of said battery compartment cover in a state where said stand is closed;
   a first stepped portion is formed on the inner periphery of the notch of said battery compartment cover; and
   a second stepped portion is formed on the outer periphery of said stand so as to be opposed to said first stepped portion.

2. A portable liquid crystal display device according to claim 1, wherein the notch in said battery compartment cover is slightly wider than the width of said stand, so that the interior of said battery-holding portion can be seen through from outside the battery-holding portion in a state where said stand is closed.

3. A portable liquid crystal display device according to claim 1, wherein a window is formed in said stand at a portion facing said battery-holding portion, so that the interior of the battery-holding portion can be seen through from outside the battery-holding portion in a state where said stand is closed.

4. A portable liquid crystal display device powered by batteries comprising:
   a case having, on a back surface side thereof, a battery-holding portion which is a recessed portion for holding the batteries; and
   a battery compartment cover for opening and closing an opening for replacing the batteries in said battery-holding portion; wherein:
   as engaging pieces formed on an upper end of said battery compartment cover are inserted into engaging holes formed in an end of the battery-holding portion of said case, a lower end of said battery compartment cover swings with the engaging pieces working as a fulcrum, and the battery-holding portion is opened and closed as said battery compartment cover swings to open and close said opening;
   a depressing portion is formed on a lower wall of said battery compartment cover, the depressing portion being sandwiched between two slits,
   a hook protrudes from a lower end of said depressing portion on a side of said battery compartment cover so as to engage with an engaging hole formed in an end of said case, and
   said hook is disengaged from said engaging hole upon depressing said depressing portion.

5. A portable liquid crystal display device according to claim 4, wherein there is provided a stand supported by mounting shafts allowing the stand to swing relative to said case and to move between a state where it is opened with a swinging motion from a back surface of said case and a state where it is closed onto a back surface side of said case; and
   recessed portions are formed in said lower case and in said battery compartment cover for holding the stand, and a holding portion is formed on a back surface of said battery compartment cover to support the batteries held in said battery-holding portion.

6. A portable liquid crystal display device according to claim 5, wherein the holding portion formed on the back surface of said battery compartment cover is curved so as to comply with the shape of the side surfaces of the batteries held in said battery-holding portion.

7. A portable liquid crystal display device according to claim 5, wherein said stand is provided with deflection arms formed by kerfs, and holes of approximately a circular shape larger than at least a width of the kerfs are formed at points where stress concentrates in a bottom portion of the kerfs.

8. A portable liquid crystal display device according to claim 5, wherein the width of said stand on a side of a free end thereof is larger than the width of said stand on a side of rotary end thereof.

9. A portable liquid crystal display device according to claim 5, wherein a free end side of said stand is asymmetrical with respect to a center line on a rotary end side of said stand.

10. A portable liquid crystal display device according to claim 4, wherein guide poles are provided at portions where end surfaces on an upper inner wall of said battery-holding portion intersect outer sides of side walls provided on said battery-holding portion, so as to come in contact with ends of side walls on said battery compartment cover in order to guide engaging pieces formed on end surfaces of the side walls of said battery compartment cover to engaging recessed portions formed in stepped portions of said battery holding portion of said case.

11. A portable liquid crystal display device according to claim 10, wherein engaging pieces are formed on an inside of said battery compartment cover to come into engagement with engaging recessed portions formed in top surfaces of the case neighboring the side walls of said battery-holding portion, and engaging pieces are formed in end surfaces on a lower end side of the side walls of said battery compartment cover to come into engagement with engaging recessed portions formed on a lower end side of the stepped portions of said battery holding portion of said case.

12. A portable liquid crystal display device in which a display window through which a display on an incorporated liquid crystal display panel can be viewed, is formed in a case, and a windshield is arranged in a recessed portion for arranging the windshield formed in a recessed manner in said case surrounding said display window, wherein:

a recessed portion for arranging an ornamental member in the portable liquid crystal display device is provided in common surrounding the recessed portion for arranging said windshield;

at least one protuberance is continuously formed in the recessed portion surrounding said display window;

the protuberance protruding by a predetermined height from said recessed portion;

bed plates for placing the ornamental member are formed on said recessed portion and spaced from said protuberance, said bed plates having a height larger than the height of said protuberance from said recessed portion but smaller than the height extending from said recessed portion to the outer surface of said case;

a back surface of said windshield comes into contact with said protuberance when said windshield is mounted on said recessed portion by a mounting means; and said ornamental member is mounted on said bed plates by the mounting means.

13. A portable liquid crystal display device according to claim 12, wherein said mounting means is provided on at least two places on said recessed portion on the periphery of said protuberance, and said mounting means being sandwiched between the windshield and the recessed portion.

14. A portable liquid crystal display device according to claim 12, wherein said protuberance has nearly a circular shape, nearly a triangular shape, a square shape, or a polygonal shape in cross section in a direction perpendicular to the direction in which said protuberance extends.

15. A portable liquid crystal display device wherein a display window is formed in a case so that a display on a liquid crystal display panel incorporated therein can be viewed, a windshield is arranged in a recessed portion formed in said case surrounding said display window; and an ornamental member of a color tone different from the color tone of said case is arranged surrounding said display window, wherein:

a recessed portion for installing said ornamental member is formed surrounding said display window, bed plates for placing said ornamental member are formed on said recessed portion surrounding said display window;

said bed plates having a height from said recessed portion which is smaller than the height extending from said recessed portion up to the outer surface of said case; and said ornamental member is mounted on said bed plate by a mounting means.

16. A portable liquid crystal display device according to claim 12 or 15, wherein a first inclined surface inclined toward a bottom surface of the recessed portion of said case is formed along at least one edge of said recessed portion, a second inclined surface opposed to said first inclined surface is formed on a surface of said ornamental member near the outer periphery thereof, and said ornamental member is mounted on said recessed portion in a state where said second inclined surface of said ornamental member is overlapped on said first inclined surface.

17. A portable liquid crystal display device according to claim 16 wherein a visor portion is formed at an edge on an outer peripheral side of said second inclined surface of said ornamental member so as to slightly protrude outward from said second inclined surface, and is overlapped on an outer surface near said recessed portion of said case when said ornamental member is mounted on said case.

18. A portable liquid crystal display device according to claim 15, wherein said ornamental member is formed of an ABS material or an ABS material blended with a metal powder.

19. A portable liquid crystal display device according to claim 12 or 15, wherein said mounting means comprises at least one of an adhesive agent, a sticking agent or a melt-adhering agent.

20. A portable liquid crystal display device according to claim 19, wherein said adhesive agent is a double-sided adhesive tape.

* * * * *

UNITED STATES PATENT AND TRADEMARK OFFICE
CERTIFICATE OF CORRECTION

PATENT NO.    : 6,352,322 B1
DATED         : March 5, 2002
INVENTOR(S)   : Takuji Nakao It is certified that error appears in the above-identified patent and that said Letters Patent is hereby corrected as shown below:

<u>Column 28,</u>
Line 37, "on a surface" should read -- on a back surface --.

Signed and Sealed this

Fourth Day of February, 2003

JAMES E. ROGAN
*Director of the United States Patent and Trademark Office*